United States Patent
Zeng et al.

(10) Patent No.: US 11,153,179 B2
(45) Date of Patent: Oct. 19, 2021

(54) NEURAL-NETWORK-BASED LINK-LEVEL PERFORMANCE PREDICTION

(71) Applicant: QUALCOMM incorporated, San Diego, CA (US)

(72) Inventors: Weiliang Zeng, San Diego, CA (US); Sanaz Barghi, Carlsbad, CA (US); Siddhartha Mallik, San Diego, CA (US); Taesang Yoo, San Diego, CA (US); Yisheng Xue, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/565,364

(22) Filed: Sep. 9, 2019

(65) Prior Publication Data
US 2021/0075691 A1    Mar. 11, 2021

(51) Int. Cl.
*H04L 12/24*    (2006.01)
*G06N 3/04*    (2006.01)
(Continued)

(52) U.S. Cl.
CPC ............. *H04L 41/16* (2013.01); *G06N 3/04* (2013.01); *H04L 1/0061* (2013.01);
(Continued)

(58) Field of Classification Search
CPC ..... H04L 41/16; H04L 41/147; H04L 1/0061; H04L 5/0048; H04L 25/0202;
(Continued)

(56) References Cited

U.S. PATENT DOCUMENTS 8,498,639 B2 * 7/2013 Chen .................... H04L 1/0027
455/434
9,184,880 B2    11/2015 Vos
(Continued)

FOREIGN PATENT DOCUMENTS

EP    1396947 A1    3/2004

OTHER PUBLICATIONS

Elwekeil M ., et al., "Deep Convolutional Neural Networks for Link Adaptations in MIMO-OFDM Wireless Systems", IEEE Wireless Communications Letters, IEEE, Piscataway, NJ, USA, vol. 8, No. 3, Jun. 1, 2019 (Jun. 1, 2019), pp. 665-668, XP011730922, ISSN: 2162-2337, DOI: 10.1109/LWC.2018.2881978[retrieved on Jun. 18, 2019] Abstract, Sections I and II, Figure 1.
(Continued)

*Primary Examiner* — Yemane Mesfin
*Assistant Examiner* — Intekhaab A Siddiquee
(74) *Attorney, Agent, or Firm* — Kevin M. Donnelly; Holland & Hart LLP

(57) ABSTRACT

Methods, systems, and devices for wireless communications are described, and relate to a base station to communicating with a user equipment (UE) over a channel. A first device (for example, the base station or the UE) may use a trained neural network to estimate one or more link performance metrics associated with the channel. Predicting the link level performance may include determining one or more neural network weights associated with one or more input parameters associated with the channel to estimate the one or more link performance metrics. The first device may report feedback to the second device based on the estimated link performance metrics. Based on the feedback, the second
(Continued)

device may adapt the link by adjusting channel parameters to improve the reliability or efficacy of later transmissions.

30 Claims, 23 Drawing Sheets

(51) Int. Cl.
*H04L 1/00* (2006.01)
*H04L 5/00* (2006.01)
*H04L 25/02* (2006.01)
*H04L 27/26* (2006.01)
*H04L 12/26* (2006.01)
*H04W 72/08* (2009.01)
*H04L 1/20* (2006.01)

(52) U.S. Cl.
CPC ........ *H04L 5/0048* (2013.01); *H04L 25/0202* (2013.01); *H04L 27/2601* (2013.01); *H04L 41/147* (2013.01); *H04L 43/08* (2013.01); *H04W 72/085* (2013.01)

(58) Field of Classification Search
CPC ....... H04L 27/2601; H04L 43/08; G06N 3/04; H04W 72/085
USPC ......................................................... 370/252
See application file for complete search history.

(56) References Cited

U.S. PATENT DOCUMENTS

2017/0201299 A1* 7/2017 Nammi .................. H04L 67/22
2019/0319868 A1* 10/2019 Svennebring ......... H04L 41/147
2019/0392833 A1* 12/2019 Maeng .................... G06F 3/167

OTHER PUBLICATIONS

International Search Report and Written Opinion—PCT/US2020/049585—ISA/EPO—Nov. 20, 2020.
Saxena V., et al., "Deep Learning for Frame Error Probability Prediction in BICM-OFDM Systems", ARXIV.ORG, Cornell University Library, 201 Olin Library Cornell University Ithaca, NY 14853, Oct. 31, 2017 (Oct. 31, 2017), 5 Pages, XP081297253, Introduction, Sections 2 and 3.
Strodthoff N., et al., "Enhanced Machine Learning Techniques for Early HARQ Feedback Prediction in 5G", ARXIV.ORG, Cornell University Library, 201 Olin Library Cornell University Ithaca, NY 14853, Jul. 27, 2018 (Jul. 27, 2018), pp. 1-14, XP081554303, DOI: 10.1109/JSAC.2019.2934001 Abstract, Sections I and II.
Wang K: "Ricean K-Factor Estimation Based on Channel Quality Indicator in OFDM Systems using Neural Network", ARXIV.ORG, Cornell University Library, 201 Olin Library Cornell University Ithaca, NY 14853, Aug. 15, 2018 (Aug. 15, 2018), pp. 1-11, XP080898399, The Whole Document.

\* cited by examiner

NEURAL-NETWORK-BASED LINK-LEVEL PERFORMANCE PREDICTION

FIELD OF TECHNOLOGY

The following relates generally to wireless communications and more specifically to neural-network-based link-level performance prediction.

BACKGROUND

Wireless communications systems are widely deployed to provide various types of communication content such as voice, video, packet data, messaging, broadcast, and so on. These systems may be capable of supporting communication with multiple users by sharing the available system resources (for example, time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

A UE may communicate with a base station in downlink and uplink transmissions over a channel. In some cases, the UE or the base station may estimate a quality of the channel and report the estimated channel quality as feedback. But channel parameters may change or vary over time, which may result in a deviation between the estimated channel quality and the channel quality during a transmission.

SUMMARY

The described techniques relate to improved methods, systems, devices, and apparatuses that support neural-network-based link-level performance prediction. Generally, the described techniques may enable a base station and a user equipment (UE) to communicate over a channel in downlink and uplink transmissions. A first device (for example, the base station or the UE) may use a trained neural network to predict a link level performance and estimate one or more link performance metrics associated with the channel. One example, among others, of the link performance metrics may be a predicted block error rate (BLER). Predicting the link level performance may include determining one or more neural network weights associated with one or more channel parameters to estimate the one or more link performance metrics. In some examples, the neural network may be configured for one or both of offline training (for example, before the first device is deployed) or online training (for example, after the first device is deployed). In some examples, the neural network may be trained in the offline configuration based on one or more of collected data, simulations, or other information. In some examples, the first device may train the neural network in the online configuration based on one or more of collected data, measurements, metrics, or other information. The online training may, in some implementations, reduce the complexity of implementing the neural network at the first device. In some examples, the neural network may undergo further training (or retraining) at one or more devices in the network for further configuration to a specific environment or specific operating conditions.

The first device may report feedback to the second device based on the estimated one or more link performance metrics. Based on the feedback, the second device may adjust transmission parameters or adapt one or more of the link between the two devices or another link to improve the reliability of later transmissions.

A method of wireless communications is described. The method may include identifying, at a first device, a channel for communicating with a second device, determining one or more neural network weights associated with one or more input parameters associated with the channel, estimating one or more link performance metrics associated with the channel from one or more reference signals based on the one or more neural network weights and the one or more input parameters, and transmitting, to the second device, one or more feedback indicators associated with the channel based on the one or more link performance metrics.

An apparatus for wireless communications is described. The apparatus may include a processor, memory coupled with the processor, and instructions stored in the memory. The instructions may be executable by the processor to cause the apparatus to identify, at a first device, a channel for communicating with a second device, determine one or more neural network weights associated with one or more input parameters associated with the channel, estimate one or more link performance metrics associated with the channel from one or more reference signals based on the one or more neural network weights and the one or more input parameters, and transmit, to the second device, one or more feedback indicators associated with the channel based on the one or more link performance metrics.

Another apparatus for wireless communications is described. The apparatus may include means for identifying, at a first device, a channel for communicating with a second device, determining one or more neural network weights associated with one or more input parameters associated with the channel, estimating one or more link performance metrics associated with the channel from one or more reference signals based on the one or more neural network weights and the one or more input parameters, and transmitting, to the second device, one or more feedback indicators associated with the channel based on the one or more link performance metrics.

A non-transitory computer-readable medium storing code for wireless communications is described. The code may include instructions executable by a processor to identify, at a first device, a channel for communicating with a second device, determine one or more neural network weights associated with one or more input parameters associated with the channel, estimate one or more link performance metrics associated with the channel from one or more reference signals based on the one or more neural network weights and the one or more input parameters, and transmit, to the second device, one or more feedback indicators associated with the channel based on the one or more link performance metrics.

Some examples of the method, apparatuses, and non-transitory computer-readable medium described herein may further include operations, features, means, or instructions for receiving a transport block from the second device based on the one or more feedback indicators.

Some examples of the method, apparatuses, and non-transitory computer-readable medium described herein may further include operations, features, means, or instructions for initiating decoding of the transport block based on the one or more link performance metrics.

Some examples of the method, apparatuses, and non-transitory computer-readable medium described herein may further include operations, features, means, or instructions for determining not to decode the transport block based on the one or more link performance metrics, where the one or more feedback indicators include a negative acknowledgment.

Some examples of the method, apparatuses, and non-transitory computer-readable medium described herein may further include operations, features, means, or instructions for decoding one or more initial code blocks of the transport block, and determining not to decode one or more subsequent code blocks of the transport block based on the one or more link performance metrics.

Some examples of the method, apparatuses, and non-transitory computer-readable medium described herein may further include operations, features, means, or instructions for determining a set of repetitions of the transport block in one or more of a frequency domain, a time domain, or a spatial domain, and decoding one or more of the set of repetitions of the transport block based on the one or more link performance metrics.

In some examples of the method, apparatuses, and non-transitory computer-readable medium described herein, the one or more link performance metrics include one or more of a block error rate associated with the channel, a throughput associated with the channel, a spectrum efficiency associated with the channel, or a scaled value representing a link performance. In some examples of the method, apparatuses, and non-transitory computer-readable medium described herein, the block error rate may be associated with a modulation and coding scheme of the channel. In some examples of the method, apparatuses, and non-transitory computer-readable medium described herein, estimating the one or more link performance metrics may include operations, features, means, or instructions for estimating the one or more link performance metrics based on one or more of a demodulation reference signal or a channel state information reference signal.

In some examples of the method, apparatuses, and non-transitory computer-readable medium described herein, each link performance metric of the one or more link performance metrics corresponds to a respective modulation and coding scheme.

In some examples of the method, apparatuses, and non-transitory computer-readable medium described herein, the one or more input parameters associated with the channel include one or more of a modulation and coding scheme, a rank, a precoding matrix indicator, an estimated Doppler measurement, an interference variance estimation, a noise variance estimation, a decoder feature, or a hybrid automatic repeat request.

In some examples of the method, apparatuses, and non-transitory computer-readable medium described herein, the one or more feedback indicators include one or more of one or more acknowledgments, one or more negative acknowledgments, one or more precoding matrix indicators, one or more rank indicators, one or more channel quality indicators, one or more channel state information reports, one or more downlink feedback information, or one or more new data indicators.

In some examples of the method, apparatuses, and non-transitory computer-readable medium described herein, each feedback indicator of the one or more feedback indicators corresponds to a respective transmission-reception point, a respective panel, or a respective beam associated with the second device.

Some examples of the method, apparatuses, and non-transitory computer-readable medium described herein may further include operations, features, means, or instructions for transmitting one or more additional feedback indicators associated with the channel based on one or more of a punctured packet from the second device or a transmission from the second device preempted by an ultra-reliable low-latency communication intended for a third device.

A method of wireless communications is described. The method may include identifying, at a second device, a channel for communicating with a first device, receiving, from the first device, one or more feedback indicators associated with the channel and based on one or more link performance metrics, determining one or more parameters of the channel based on the one or more feedback indicators, and communicating, with the first device, based on determining the one or more parameters of the channel.

An apparatus for wireless communications is described. The apparatus may include a processor, memory coupled with the processor, and instructions stored in the memory. The instructions may be executable by the processor to cause the apparatus to identify, at a second device, a channel for communicating with a first device, receive, from the first device, one or more feedback indicators associated with the channel and based on one or more link performance metrics, determine one or more parameters of the channel based on the one or more feedback indicators, and communicate, with the first device, based on determining the one or more parameters of the channel.

Another apparatus for wireless communications is described. The apparatus may include means for identifying, at a second device, a channel for communicating with a first device, receiving, from the first device, one or more feedback indicators associated with the channel and based on one or more link performance metrics, determining one or more parameters of the channel based on the one or more feedback indicators, and communicating, with the first device, based on determining the one or more parameters of the channel.

A non-transitory computer-readable medium storing code for wireless communications is described. The code may include instructions executable by a processor to identify, at a second device, a channel for communicating with a first device, receive, from the first device, one or more feedback indicators associated with the channel and based on one or more link performance metrics, determine one or more parameters of the channel based on the one or more feedback indicators, and communicate, with the first device, based on determining the one or more parameters of the channel.

Some examples of the method, apparatuses, and non-transitory computer-readable medium described herein may further include operations, features, means, or instructions for transmitting a transport block to the first device based on determining the one or more parameters of the channel.

In some examples of the method, apparatuses, and non-transitory computer-readable medium described herein, transmitting the transport block to the first device may include operations, features, means, or instructions for transmitting a set of repetitions of the transport block in one or more of a frequency domain, a time domain, or a spatial domain.

Some examples of the method, apparatuses, and non-transitory computer-readable medium described herein may further include operations, features, means, or instructions for determining a quantity of repetitions of the transport block based on determining the one or more parameters of the channel, where transmitting the set of repetitions of the transport block may be based on determining the quantity of repetitions.

In some examples of the method, apparatuses, and non-transitory computer-readable medium described herein, the one or more link performance metrics include one or more of a block error rate associated with the channel, a throughput associated with the channel, a spectrum efficiency associated with the channel, or a scaled value representing a link performance. In some examples of the method, apparatuses, and non-transitory computer-readable medium described herein, the block error rate may be associated with a modulation and coding scheme of the channel. In some examples of the method, apparatuses, and non-transitory computer-readable medium described herein, the one or more link performance metrics may be based on one or more of a demodulation reference signal or a channel state information reference signal.

In some examples of the method, apparatuses, and non-transitory computer-readable medium described herein, the one or more parameters of the channel include one or more of a modulation and coding scheme, a rank, a precoding matrix indicator, an estimated Doppler measurement, an interference variance estimation, a noise variance estimation, a decoder feature, or a hybrid automatic repeat request.

In some examples of the method, apparatuses, and non-transitory computer-readable medium described herein, the one or more feedback indicators include one or more of one or more acknowledgments, one or more negative acknowledgments, one or more precoding matrix indicators, one or more rank indicators, one or more channel quality indicators, one or more channel state information reports, one or more downlink feedback information, one or more new data indicators, or one or more additional feedback indicators based on one or more of a punctured packet from the second device or a transmission from the second device preempted by an ultra-reliable low-latency communication intended for a third device.

In some examples of the method, apparatuses, and non-transitory computer-readable medium described herein, each feedback indicator of the one or more feedback indicators corresponds to a respective transmission-reception point of one or more transmission-reception points, a respective panel of one or more panels, or a respective beam associated with the second device of one or more beams.

Some examples of the method, apparatuses, and non-transitory computer-readable medium described herein may further include operations, features, means, or instructions for determining a transmission-reception point of the one or more transmission-reception points, a panel of the one or more panels, or a beam of the one or more beams for subsequent scheduling based on determining the one or more parameters of the channel, where communicating with the first device may be based on determining the transmission-reception point, the panel, or the beam for subsequent scheduling.

DETAILED DESCRIPTION

Figure 1:
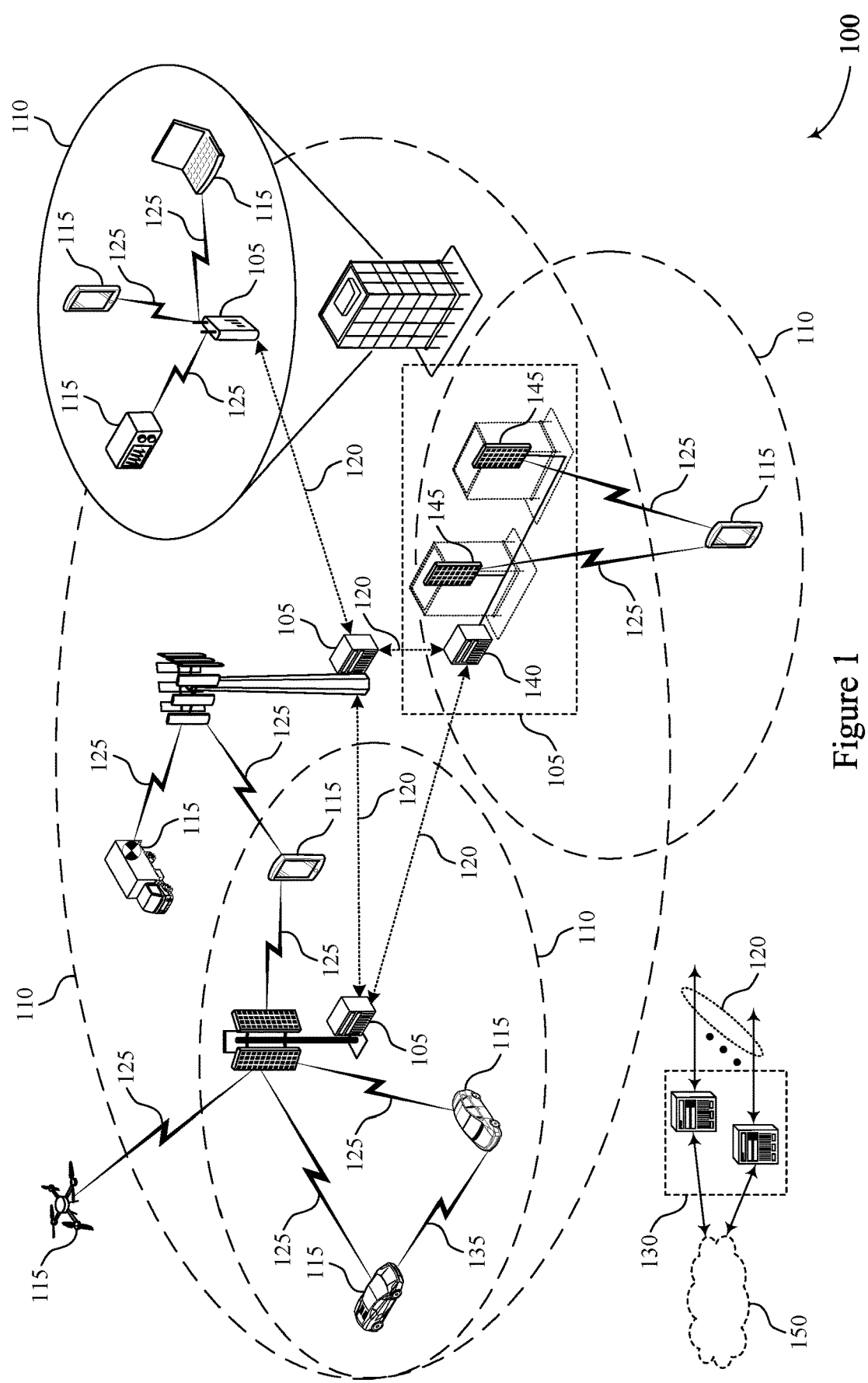
FIGS. 1 and 2 illustrate examples of a wireless communications system that supports neural-network-based link-level performance prediction in accordance with aspects of the present disclosure.

Some wireless communications systems, such as fifth generation (5G) systems which may be referred to as New Radio (NR) systems, may include devices that support channel feedback. A first device, such as a user equipment (UE), may communicate with a second device, such as a base station, in one or more of downlink (DL) or uplink (UL) transmissions over a channel. The first device may estimate a channel quality before a DL transmission and report the estimated channel quality to the second device to improve a reliability of the DL transmission, among other advantages. Similarly, the second device may estimate the channel quality before a UL transmission and report the estimated channel quality to the first device to improve a reliability of the UL transmission, among other advantages. Due to varying channel conditions and chosen estimation algorithms, the estimated channel quality may in some examples be different than the channel quality when the transmission is sent over the channel, which may decrease the efficacy of the channel quality estimates.

Techniques are described herein that may enable a device (such as a UE or a base station) to predict a link level performance of a channel for communicating with another device using a trained neural network. A first device (for example, a UE or a base station) may identify a channel for communicating with a second device. For example, the first device may identify the channel based on a scheduling grant. The first device may use one or more input parameters associated with the channel as inputs for the trained neural network. For example, the input parameters may include one or more of a channel estimation, a modulation and coding scheme (MCS), a rank, a precoding matrix indicator (PMI), a Doppler fading estimation, a noise estimation, or an interference estimation, among other examples. Each input of the neural network may be weighted. For example, the first device may determine one or more neural network weights associated with the one or more input parameters. In some examples, the neural network may be trained based on collected data or simulations.

The first device may determine the input parameters, for example, based on one or more reference signals transmitted by the second device, including one or more of a demodulation reference signal (DMRS), or a channel state information reference signal (CSI-RS), among other examples. Based on the one or more input parameters and the one or more neural network weights, the first device may use the neural network to estimate one or more link performance metrics. In some examples, the first device may tune or retrain the neural network, for example by modifying the one or more neural network weights based on additional collected data, to improve estimation of the link performance metrics. In some examples, the link performance metrics may include a predicted block error rate (BLER) for the channel. The BLER may include a real number between zero and one, which may represent a ratio of a number of erroneous blocks received to a total number of blocks sent. In some examples, the link performance metrics may include an achievable throughput, a spectrum efficiency, or a scaled value that represents the link performance.

The first device may report feedback based on the link performance metrics (for example, to the second device) to improve a reliability of later transmissions. In some examples, the feedback may include or be based on the predicted BLER or other metrics for the channel, or a quantized value which may represent the BLER number or other metrics rounded to a configured number of digits. Additionally or alternatively, the feedback may include one or more of an acknowledgment (ACK), a negative acknowledgment (NACK), a channel quality indicator (CQI), a channel state information (CSI) report, a PMI, a rank indicator (RI), a downlink feedback information report, or a new data indicator, among other examples.

In some examples, the first device may receive a transport block containing data from the second device. The first device may determine whether or not to decode the transport block based on the estimated link performance metrics. In some examples, the first device may determine to decode the transport block. In some examples, the first device may determine to skip decoding the transport block, for example, by declaring a decoding failure based on the estimated link performance metrics and may report a NACK in the feedback to the second device. In some examples, the first device may decode one or more initial code blocks of the transport block while estimating the link performance metrics, and then skip decoding one or more later code blocks of the transport block based on the estimated link performance metrics.

In some examples, the second device may transmit a quantity of repetitions of the transport block in one or more of a time domain, a frequency domain, and a spatial domain. The first device may select one or more of the quantity of repetitions based on the estimated link performance metrics. The first device may decode the selected repetitions of the transport block based on the estimated link performance metrics. For example, the first device may determine the selected repetitions may have a higher likelihood of being successfully decoded compared to the unselected repetitions.

In some examples, at least some of, if not each of, the link performance metrics of the one or more link performance metrics may correspond to a different MCS of an MCS subset for the channel. The first device may transmit a feedback indicator corresponding to one or more of the one or more estimated link performance metrics. In some examples, the second device may determine to adjust the link based on the feedback indicators. For example, the second device may select and use an MCS from the MCS subset for communicating with the first device based on the feedback indicators.

In some examples, the first device may determine information to include in a CSI report in reporting feedback based on the estimated link performance metrics. For example, the first device may determine one or more of a PMI, an RI, and a CQI to include in the CSI report. The second device may adjust the link based on the information indicated in the CSI report. In some examples, the first device may include the one or more CQIs corresponding to the MCS subset for the channel.

In some examples, the second device (for example, a base station) may include or be associated with a quantity of transmission-reception point (TRPs), panels, or beams. The second device may employ one or more of spatial domain multiplexing (SDM), frequency domain multiplexing (FDM), or time domain multiplexing (TDM) in communicating over the quantity of TRPs, panels, or beams. Each link performance metric of the one or more link performance metrics may correspond to one or more of a TRP, a panel, or a beam associated with the second device. The first device may transmit a feedback indicator corresponding to one or more of the one or more estimated link performance metrics. In some examples, the second device may select one or more of a TRP, a panel, or a beam for communicating with the first device based on the feedback indicators.

In some examples, the first device and the second device may communicate over a channel in an unlicensed radio frequency spectrum band. The first device and the second device may support wideband operation with channel access for subbands (for example, based on listen-before-talk (LBT) procedures). The second device may transmit packets, for example packets including data, to the first device in one or more subbands of the unlicensed radio frequency spectrum band. In some examples, the second device may generate a packet for a wider band, but may find that it is unable to regenerate the packet for a subband that has lost channel access (for example, based on a failed LBT procedure). The second device may determine to puncture the generated packet by transmitting a portion of the generated packet. In some examples, the second device may puncture the packet in a time domain. For example, the second device may puncture one or more symbols within a slot if the second device does not have channel access at the slot boundary.

The first device may report feedback (for example, an ACK or a NACK) associated with the punctured packet as well as feedback based on the estimated link performance metrics associated with the reference signals. In some examples, the feedback associated with the reference signals may be more reliable than the feedback associated with the punctured packet for updating a contention window for future transmissions. For example, updating the contention window based on the feedback associated with the punctured packet may unnecessarily increase the size of the contention window. The second device may update a contention window for future transmissions in the unlicensed radio frequency spectrum band based on the feedback associated with the reference signals instead of the feedback based on the punctured packet.

In some examples, a transmission for the first device may be preempted by one or more communications, such as ultra-reliable low-latency communications (URLLC) traffic, intended for a third device. The first device may estimate one or more link performance metrics based on the one or more reference signals. The first device may report feedback to the second device based on the link performance metrics to improve the reliability of later transmissions, among other benefits.

Aspects of the disclosure are initially described in the context of wireless communications systems. Additional examples of process flows are then discussed. Aspects of the disclosure are further illustrated by and described with reference to apparatus diagrams, system diagrams, and flowcharts that relate to neural-network-based link-level performance prediction.

FIG. 1 illustrates an example of a wireless communications system 100 that supports neural-network-based link-level performance prediction in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or an NR network. In some examples, the wireless communications system 100 may support one or more of enhanced broadband communications, ultra-reliable (for example, mission critical) communications, low latency communications, or communications with low-cost and low-complexity devices.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish communication links 125. The coverage area 110 may be an example of a geographic area over which a base station 105 and a UE 115 support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as one or more of the other UEs 115, the base stations 105, or network equipment (for example, core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through backhaul links 120 (for example, via an S1, N2, N3, or other interface). The base stations 105 may communicate with one another over backhaul links 120 (for example, via an X2, Xn, or other interface) either directly (for example, directly between the base stations 105), or indirectly (for example, via the core network 130), or both. In some examples, the backhaul links 120 may be or include one or more wireless links.

One or more of the base stations 105 described herein may include or may be referred to by a person of ordinary skill in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, in which the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, vehicles, or meters, among other examples.

The UEs 115 described herein may be able to communicate with various types of devices, such as other UEs 115 that may sometimes act as relays as well as base stations 105 and network equipment including macro eNBs or gNBs, small cell eNBs or gNBs, and relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (for example, a bandwidth part (BWP)) that is operated according to physical layer channels for a given radio access technology (for example, LTE, LTE-A, LTE-A Pro, NR). Each physical layer channel may carry acquisition signaling (for example, synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (for example, in a carrier aggregation configuration), a carrier may also have acquisition signaling or control signaling that coordinates operations for other carriers. A carrier may be associated with a frequency channel (for example, an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode in which initial acquisition and connection may be conducted by the UEs 115 via the carrier, or the carrier may be operated in a non-standalone mode in which a connection is anchored using a different carrier (for example, of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (for example, in an FDD mode) or may be configured to carry downlink and uplink communications (for example, in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (for example, 1.4, 3, 5, 10, 15, 20, 40, or 80 megahertz (MHz)). Devices of the wireless communications system 100 (for example, base stations 105, UEs 115, or both) may have hardware configurations that support communications over a particular carrier bandwidth or may be configurable to support communications over one of a set of carrier bandwidths. In some examples, the wireless communications system 100 may include one or both of base stations 105 or UEs 115 that support simultaneous communications via carriers associated with multiple carrier bandwidths. In some examples, each served UE 115 may be configured for operating over portions (for example, a sub-band, a BWP) or all of a carrier bandwidth.

Signal waveforms transmitted over a carrier may be made up of multiple subcarriers (for example, using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (for example, a duration of one modulation symbol) and one subcarrier, in which the symbol period and subcarrier spacing are inversely related. The number of bits carried by each resource element may depend on the modulation scheme (for example, the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (for example, spatial layers or beams), and the use of multiple spatial layers may further increase the data rate or data integrity for communications with a UE 115.

Time intervals for the base stations 105 or the UEs 115 may be expressed in multiples of a basic time unit which may, for example, refer to a sampling period of $T_s=1/(\Delta f_{max} \cdot N_f)$ seconds, in which $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (for example, 10 milliseconds (ms)). Each radio frame may be identified by a system frame number (SFN) (for example, ranging from 0 to 1023).

Each frame may include multiple consecutively numbered subframes or slots, and each subframe or slot may have the same duration. In some examples, a frame may be divided (for example, in the time domain) into subframes, and each subframe may be further divided into a number of slots. Alternatively, each frame may include a variable number of slots, and the number of slots may depend on subcarrier spacing. Each slot may include a number of symbol periods (for example, depending on the length of the cyclic prefix prepended to each symbol period). In some wireless communications systems 100, a slot may further be divided into multiple mini-slots containing one or more symbols. Excluding the cyclic prefix, each symbol period may contain one or more (for example, $N_f$) sampling periods. The duration of a symbol period may depend on the subcarrier spacing or frequency band of operation.

A subframe, a slot, a mini-slot, or a symbol may be the smallest scheduling unit (for example, in the time domain) of the wireless communications system 100 and may be referred to as a transmission time interval (TTI). In some examples, the TTI duration (for example, the number of symbol periods in a TTI) may be variable. Additionally or alternatively, the smallest scheduling unit of the wireless communications system 100 may be dynamically selected (for example, in bursts of shortened TTIs (sTTIs)).

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. A control region (for example, a control resource set (CORESET)) for a physical control channel may be defined by a number of symbol periods and may extend across the system bandwidth or a subset of the system bandwidth of the carrier. One or more control regions (for example, CORESETs) may be configured for a set of UEs 115. For example, the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (for example, control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, overlapping geographic coverage areas 110 associated with different technologies may be supported by different base stations 105. The wireless communications system 100 may include, for example, a heterogeneous network in which different types of base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support URLLC or mission critical communications. The UEs 115 may be designed to support ultra-reliable, low-latency, or critical functions (for example, mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some cases, a UE 115 may also be able to communicate directly with other UEs 115 over a device-to-device (D2D)

communication link 135 (for example, using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (for example, a mobility management entity (MME), an access and mobility management function (AMF)) and at least one user plane entity that routes packets or interconnects to external networks (for example, a serving gateway (S-GW), a Packet Data Network (PDN) gateway (P-GW), a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through a number of other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (for example, radio heads and ANCs) or consolidated into a single network device (for example, a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, because the wavelengths range from approximately one decimeter to one meter in length. UHF waves may be blocked or redirected by buildings and environmental features, but the waves may penetrate structures sufficiently for a macro cell to provide service to the UEs 115 located indoors. Transmission of UHF waves may be associated with smaller antennas and shorter ranges (for example, less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (for example, LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (for example, the same codeword) or different data streams (for example, different codewords). Different spatial layers may be associated with different antenna ports used for channel measurement and reporting. MIMO techniques include single-user MIMO (SU-MIMO), in which multiple spatial layers are transmitted to the same receiving device, and multiple-user MIMO (MU-MIMO), in which multiple spatial layers are transmitted to multiple devices.

Beamforming, which may also be referred to as spatial filtering, directional transmission, or directional reception, is a signal processing technique that may be used at a transmitting device or a receiving device (for example, a base station 105 or a UE 115) to shape or steer an antenna beam (for example, a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (for example, with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (for example, antenna panels) to conduct beamforming operations for directional communications with a UE 115. Some signals (for example, synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (for example, by a transmitting device, such as a base station 105, or a receiving device, such as a UE 115) a beam direction for later transmission or reception by the base station 105.

Some signals, such as data signals associated with a particular receiving device, may be transmitted by a base station 105 in a single beam direction (for example, a direction associated with the receiving device, such as a UE 115). In some examples, the beam direction associated with transmissions along a single beam direction may be determined based on a signal that was transmitted in different beam directions. For example, a UE 115 may receive one or more of the signals transmitted by the base station 105 in different directions and may report to the base station 105 an indication of the signal that the UE 115 received with a highest signal quality, or an otherwise acceptable signal quality.

In some cases, transmissions by a device (for example, by a base station 105 or a UE 115) may be performed using multiple beam directions, and the device may use a combination of digital precoding or radio frequency beamforming to generate a combined beam for transmission (for example, from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (for example, a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (for example, a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (for example, for identifying a beam direction for later transmission or reception by the UE 115) or for transmitting a signal in a single direction (for example, for transmitting data to a receiving device).

A receiving device (for example, a UE 115) may try multiple receive configurations (for example, directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (for example, different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (for example, when receiving a data signal). The single receive configuration may be aligned in a beam direction determined based on listening according to different receive configuration directions (for example, a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the Physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (for example, using a cyclic redundancy check (CRC)), forward error correction (FEC), and retransmission (for example, automatic repeat request (ARQ)). HARQ may improve throughput at the MAC layer in poor radio conditions (for example, low signal-to-noise conditions). In some examples, a device may support same-slot HARQ feedback, in which the device may provide HARQ feedback in a specific slot for data received in a previous symbol in the slot. In other cases, the device may provide HARQ feedback in a later slot, or according to some other time interval.

A base station 105 (for example, a gNB in an NR system) may communicate with a UE 115 over a channel. In some cases, the UE 115 or the base station 105 may estimate a quality of the channel and report the estimated channel quality as feedback. But channel parameters may change or vary over time, which may result in a deviation between the estimated channel quality and the channel quality during one or more transmissions. To improve estimation of the channel quality, a first device (for example, the base station 105 or the UE 115) may predict a link level performance using a trained neural network. The neural network may receive current communications measurements, including one or more input parameters associated with the channel, as input. Each input of the neural network may be weighted. For example, the first device may determine one or more neural network weights associated with the one or more input parameters. Predicting the link level performance may include estimating one or more link performance metrics that reflect an accurate estimation of the channel quality based on the one or more input parameters and the one or more neural network weights.

In some examples, the neural network may be configured for one or both of offline training (for example, before the first device is deployed) or online training (for example, after the first device is deployed). In some examples, the neural network may be trained in the offline configuration based on one or more of collected data, simulations, or other information. In some examples, the first device may train the neural network in the online configuration based on one or more of collected data, measurements, metrics, or other information. The online training may reduce the complexity of implementing the neural network. In some examples, the neural network may undergo further training (or retraining), for example, at the first device, for further configuration to a specific environment or specific operating conditions (for example, based on one or more of additional reference signals received from the second device, channel degradation, a sudden burst of interference on the channel, or other conditions).

The first device may report feedback to the second device based on the one or more estimated link performance metrics. Based on the feedback, the second device may adapt the link by adjusting one or more channel parameters to improve the reliability of later transmissions, among other advantages. The wireless communications system 100 may therefore include features for efficient data transmission while reducing data lost to interference, among other benefits.

Figure 2:
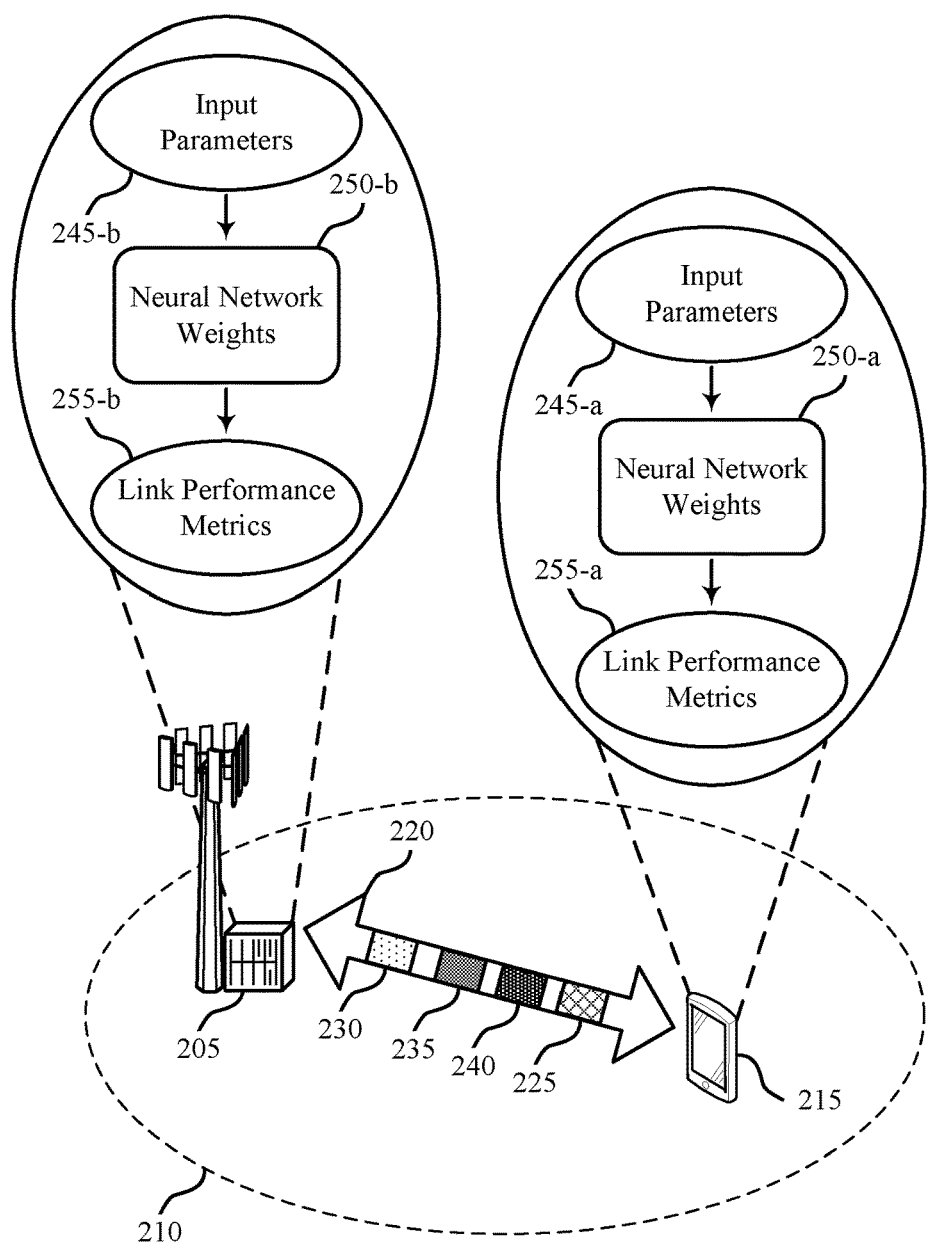

FIG. 2 illustrates an example of a wireless communications system 200 that supports neural-network-based link-level performance prediction in accordance with aspects of the present disclosure. In some examples, the wireless communications system 200 may implement aspects of the wireless communications system 100. For example, the wireless communications system 200 may include a base station 205 and a UE 215, which may be examples of the corresponding devices described with reference to FIG. 1. The base station 205 may provide a geographic coverage area 210. The base station 205 and the UE 215 may communicate over a channel 220 via one or more of DL transmissions 225 and UL transmissions 230.

In some examples, such as for the DL transmissions 225, the UE 215 may receive one or more reference signals 240 (for example, one or both of a DMRS and a CSI-RS) from the base station 205. The UE 215 may use a trained neural network by determining one or more neural network weights 250-*a* associated with one or more input parameters 245-*a* of the channel 220. The UE 215 may determine the input parameters 245-*a* based on the reference signals 240. The UE 215 may use the trained neural network to estimate one or more link performance metrics 255-*a* (for example, a BLER) for the channel 220 based on the input parameters 245-*a* and the associated neural network weights 250-*a*. The UE 215 may transmit one or more feedback indicators 235 to the base station 205 based on the estimated link performance metrics 255-*a*. The base station 205 may adjust the DL transmissions 225 (for example, by adjusting one or more of the input parameters 245-*a*) based on the feedback indicators 235 to improve a reliability of the DL transmissions 225.

In some examples, such as for the UL transmissions 230, the base station 205 may determine one or more input parameters 245-*b* based on receiving one or more reference signals 240 from the UE 215. The base station 205 may use a trained neural network by determining one or more neural network weights 250-*b* associated with the input parameters 245-*b*. The base station 205 may use the trained neural network to estimate one or more link performance metrics 255-*b* for the channel 220 based on the input parameters 245-*b* and the associated neural network weights 250-*b*. The base station 205 may transmit one or more feedback indicators 235 (for example, one or both of a downlink feedback information report or a new data indicator) to the UE 215 based on the estimated link performance metrics 255-*b*. The UE 215 may adjust the UL transmissions 230 (for example, by adjusting one or more of the input parameters 245-*b*) based on the feedback indicators 235 to improve a reliability of the UL transmissions 230.

A DL transmission 225 may include one or more transport blocks. The UE 215 may determine whether or not to decode the one or more transport blocks based on the estimated link performance metrics 255-*a*. In some examples, the base station 205 may transmit a quantity of repetitions of a transport block in one or more of a time domain, a frequency domain, or a spatial domain. In such examples, the UE 215 may select one or more of the quantity of repetitions based on the estimated link performance metrics 255-*a*. The UE 215 may decode the selected repetitions of the transport block based on the estimated link performance metrics 255-*a*.

In some examples, the UE 215 may transmit feedback indicators 235 (for example, BLERs) based on the quantity of repetitions of the transport block. The base station 205 may determine to terminate the quantity of repetitions early based on the feedback indicators 235. For example, the base station 205 may determine that the UE 215 has successfully received a sufficient number of repetitions of the transport block based on the feedback indicators 235, and determine not to transmit additional repetitions. In some examples, the base station 205 may adjust the quantity of repetitions (for example, the quantity of repetitions necessary to satisfy a threshold or otherwise be sufficient) for later scheduling of the DL transmissions 225 based on the feedback indicators 235.

In some examples, each of the link performance metrics 255-*a* may correspond to a different MCS of an MCS subset for the channel 220. The UE 215 may transmit one or more feedback indicators 235 corresponding to one or more of the estimated link performance metrics 255-*a*. In some examples, the base station 205 may select an MCS from the MCS subset for the channel 220 based on the feedback indicators 235.

In some examples, each of one or more of the feedback indicators 235 may include a CSI report. The UE 215 may determine one or more of a PMI, an RI, and a CQI to include in the CSI report based on the estimated link performance metrics 255-*a*. In some examples, the CSI report may include one or more CQIs corresponding to the MCS subset for the channel 220.

In some examples, the base station 205 may be associated with or include a quantity of TRPs, panels, or beams. The base station 205 may transmit the same transport block over one or more of the quantity of TRPs, panels, or beams using one or more of SDM, FDM, or TDM. One or more of the link performance metrics 255-*a* may correspond to one or more of a TRP, a panel, or a beam associated with the second device. The UE 215 may transmit a feedback indicator 235 (for example, an ACK or a NACK) corresponding to the transport block. In some examples, the UE 215 may transmit one or more additional feedback indicators 235 (for example, BLERs based on the reference signals 240) corresponding to each of the quantity of TRPs, panels, or beams. In some examples, the base station 205 may select one or more of a TRP, a panel, or a beam for communicating with the UE 215 in DL transmissions 225 based on the feedback indicators 235.

In some examples, the channel 220 may be in an unlicensed radio frequency spectrum band. The base station may transmit packets in the DL transmissions 225 in subbands of the unlicensed radio frequency spectrum band. In some examples, the base station 205 may generate a packet for a wider band, but the base station 205 may be unable to regenerate the packet for a subband that has lost channel access. The base station 205 may determine to puncture the generated packet. The UE 215 may estimate one or more link performance metrics 255-*a* associated with the punctured packet in addition to the link performance metrics 255-*a* associated with the reference signals 240 (for example, a DMRS). The UE 215 may transmit the feedback indicators 235 (for example, an ACK or a NACK) based on the estimated link performance metrics 255-*a* associated with the punctured packet in addition to the feedback indicators 235 based on the estimated link performance metrics 255-*a* associated with the reference signals 240. In some examples, the feedback indicators 235 associated with the reference signals 240 may be more reliable than the feedback indicators 235 associated with the punctured packet for updating a contention window for later DL transmissions 225. For example, updating the contention window based on the feedback indicators 235 associated with the punctured packet may unnecessarily increase the size of the contention window. The base station 205 may then update the contention window for later DL transmissions 225 in the unlicensed radio frequency spectrum band based on the feedback indicators 235 associated with the reference signals 240 rather than the feedback indicators 235 associated with the punctured packet.

In some examples, the DL transmissions 225 may be preempted by traffic, for example URLLC traffic, intended for a device other than the UE 215. The UE 215 may estimate one or more link performance metrics 255-*a* based on determining one or more neural network weights 250-*a* associated with the reference signals 240, rather than based on the preempted DL transmissions 225. The UE 215 may transmit the feedback indicators 235 to the second device based on the link performance metrics 255-*a* associated with the reference signals 240 to improve the reliability of later DL transmissions 225, among other benefits.

Figure 3:
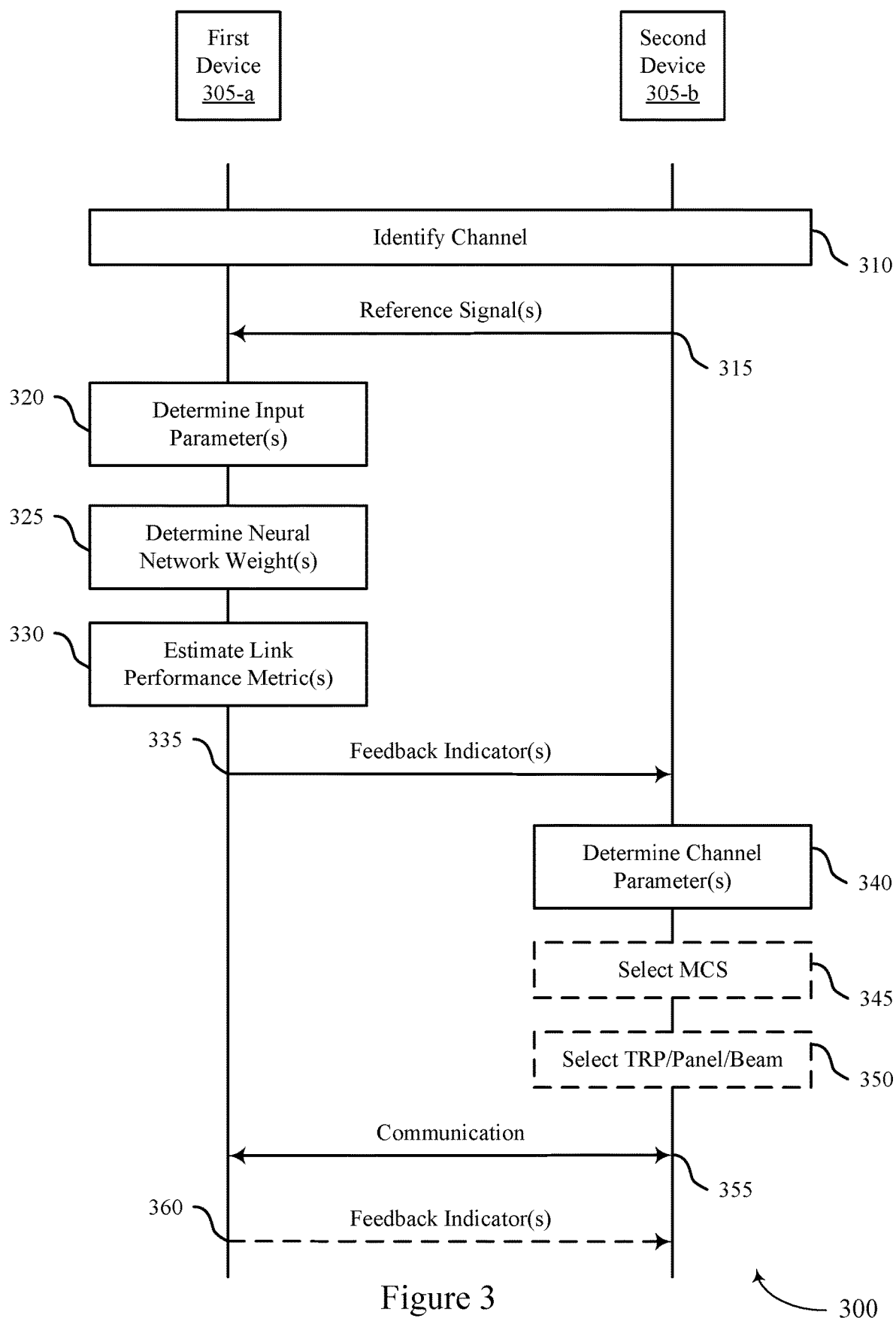
FIGS. 3 and 4 illustrate examples of process flows that support neural-network-based link-level performance prediction in accordance with aspects of the present disclosure.

FIG. 3 illustrates an example of a process flow 300 that supports neural-network-based link-level performance prediction in accordance with aspects of the present disclosure. In some examples, the process flow 300 may be implemented by aspects of the wireless communications systems 100 and 200. The process flow 300 may relate to one or more actions performed by a first device 305-*a* and a second device 305-*b*, which may be examples of a base station 105 described with reference to FIG. 1, a UE 115 described with reference to FIG. 1, a UE 215 described with reference to FIG. 2, or a base station 205 described with reference to FIG. 2. The process flow 300 may also involve one or more additional devices (not shown). Alternative examples of the following may be implemented, where some steps may be performed in a different order than described or may not be performed at all. In some examples, steps may include additional features not mentioned below, or further steps may be added.

At 310, the first device 305-*a* and the second device 305-*b* may identify a channel for communication. In some examples, one or both of the first device 305-*a* or the second device 305-*b* may identify the channel based on a scheduling grant.

At 315, the second device 305-*b* may transmit one or more reference signals to the first device 305-*a*. In some implementations, the reference signals may include one or more of a DMRS, or a CSI-RS, among other examples. At 320, the first device may determine one or more input parameters associated with the channel based on the reference signals. In some examples, the input parameters may include an MCS or an MCS subset for communication over the channel. In some examples, the reference signals may correspond to a quantity of one or more of TRPs, panels, or beams associated with the second device 305-*b*. The second device 305-*b* may transmit the reference signals over one or more of the quantity of TRPs, panels, or beams using one or more of SDM, FDM, or TDM.

At 325, the first device 305-*a* may determine one or more neural network weights for the input parameters. The first device 305-*a* may determine the one or more neural network weights based on a trained neural network, for example, by determining one or more of the neural network weights associated with one or more of the input parameters. In some examples, the neural network may be configured for one or both of offline training (for example, before the first device 305-*a* is deployed) or online training (for example, after the first device 305-*a* is deployed). In some examples, the neural network may be trained in the offline configuration based on one or more of collected data, simulations, or other information. In some examples, the first device 305-*a* may train the neural network in the online configuration based on one or more of collected data, measurements, metrics, or other information. The online training may, in some implementations, reduce the complexity of implementing the neural network at the first device 305-*a*. In some examples, the neural network may undergo further training (or retraining) at the first device 305-*a* for further configuration to a specific environment or specific operating conditions of the first device 305-*a* (for example, based on one or more of additional reference signals received from the second device 305-*b*, channel degradation, a sudden burst of interference on the channel, or other conditions).

At 330, the first device 305-*a* may estimate one or more link performance metrics based on the one or more neural network weights and the one or more input parameters. In some examples, the link performance metrics may include one or more predicted BLERs or other metrics for the channel. In some examples, the first device 305-*a* may estimate a link performance metric for one or more MCSs, if not each MCS, of the MCS subset for the channel. For examples, the first device 305-*a* may estimate a first link performance metric for a first MCS when the first MCS is used as an input parameter, and the first device 305-*a* may estimate a second link performance metric for a second MCS when the second MCS is used as an input parameter. In some examples, the first device 305-*a* may estimate a link performance metric for each TRP, panel, or beam of the quantity of TRPS, panels, or beams.

At 335, the first device 305-*a* may transmit one or more feedback indicators to the second device 305-*b* based on the estimated link performance metrics. In some examples, the feedback indicators may include or indicate the predicted BLERs, alone or in combination with other examples of link performance metrics, for the channel. In some such examples, the feedback indicators may include one or more quantized values, in which each quantized value which may represent a BLER number rounded to a configured number of digits. In some examples, the feedback indicators may include a feedback indicator based on the estimated link performance metric for each MCS of the MCS subset. In some examples, the feedback indicators may include a feedback indicator based on the estimated link performance metric for each TRP, panel, or beam of the quantity of TRPS, panels, or beams. In some examples, the feedback indicators may include one or more of an ACK, a NACK, a downlink feedback information report, or a new data indicator, among other examples. In some examples, the feedback indicators may include a CSI report based on the estimated link performance metrics. For example, the first device 305-*a* may determine one or more of a PMI, an RI, and a CQI to include in the CSI report. In some examples, the CSI report may include one or more CQIs corresponding to the MCS subset for the channel. In some examples, the first device 305-*a* may aggregate or compress a quantity of feedback indicators before transmitting the one or more feedback indicators to the second device 305-*b*. For example, the first device 305-*a* may transmit a selected one or more feedback indicators from the quantity of feedback indicators, or the first device 305-*a* may transmit all of the quantity of feedback indicators.

At 340, the second device 305-*b* may determine one or more channel parameters associated with the channel based on the feedback indicators. In some examples, the second device 305-*b* may determine to adjust the transmission, which may include adjusting one or more of the input parameters. For example, the second device 305-*b* may adjust the transmission based on the CSI report. In some examples, at 345 the second device 305-*b* may select an MCS from the MCS subset for the channel based on the feedback indicators (for example, based on the CQIs in the CSI report). In some examples, at 350, the second device 305-*b* may select a TRP, panel, or beam of the quantity of TRPS, panels, or beams for use in communicating with the first device 305-*a* based on the feedback indicators associated with the quantity of TRPS, panels, or beams.

At 355, the second device 305-*b* may communicate with the first device 305-*a* over the channel. In some examples, the first device 305-*a* may receive a transport block from the second device 305-*b*. The first device 305-*a* may determine whether or not to decode the transport block based on one or more of the estimated link performance metrics. In some examples, the second device 305-*b* may transmit a quantity of repetitions of the transport block in one or more of a time domain, a frequency domain, or a spatial domain. The first device 305-*a* may select one or more of the quantity of repetitions to decode based on the estimated link performance metrics.

In some examples, at 360, the first device 305-*a* may transmit one or more additional feedback indicators to the second device 305-*b*. The additional feedback indicators may correspond to the quantity of repetitions. In some examples, the second device 305-*b* may determine to terminate the quantity of repetitions early based on the additional feedback indicators. For example, the second device 305-*b* may determine the first device 305-*a* has successfully received a sufficient number of repetitions of the transport block based on the additional feedback indicators, and determine to not transmit additional repetitions. In some examples, the second device 305-*b* may adjust the quantity of repetitions for later scheduling of transmissions based on the additional feedback indicators.

The operations performed by the first device 305-*a* and the second device 305-*b* may therefore support improvements to predicting link-level performance at the first device 305-*a* and, in some examples, may promote improvements to the reliability of communications between the first device 305-*a* and the second device 305-*b*, among other benefits.

Figure 4:
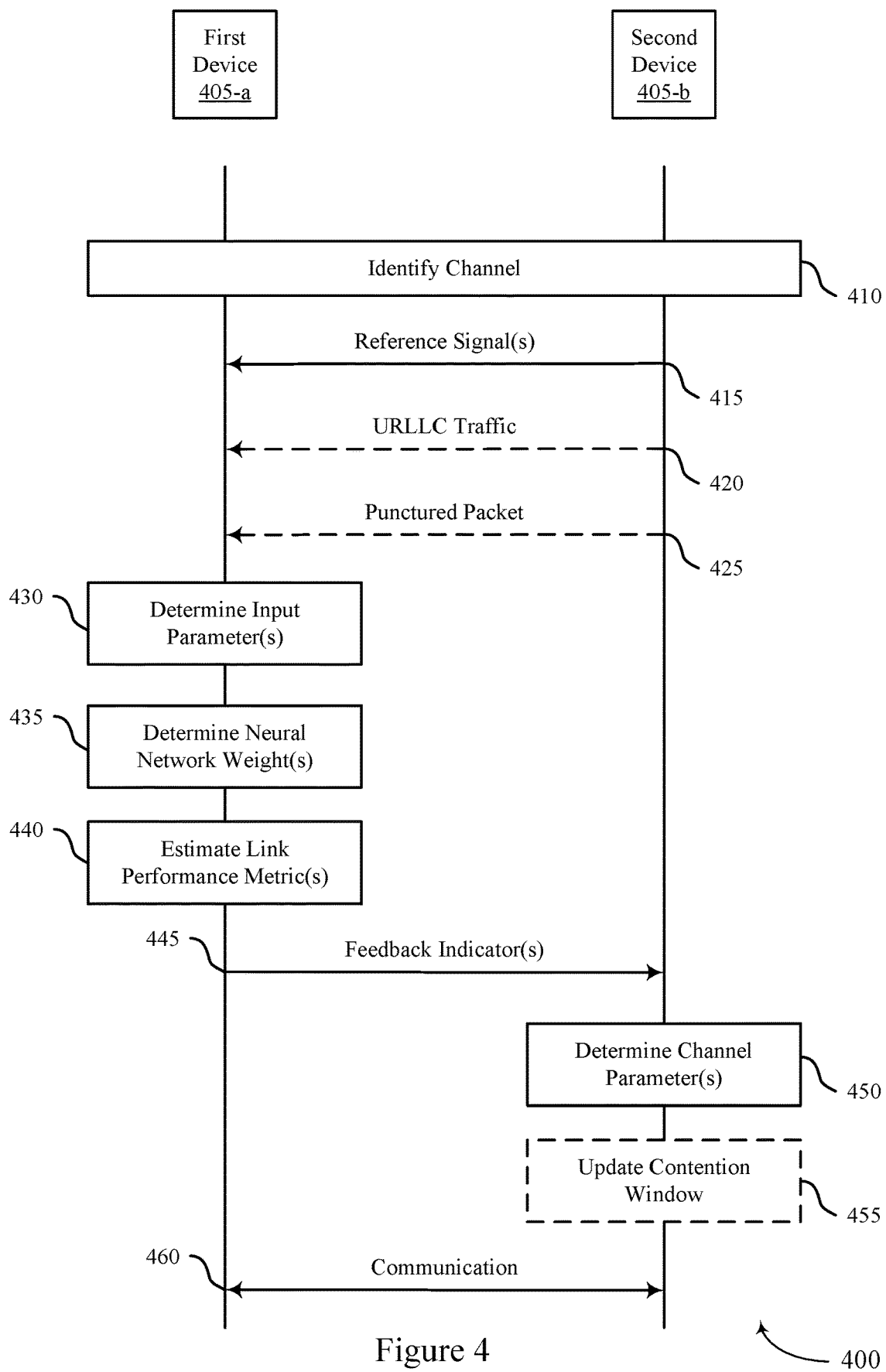

FIG. 4 illustrates an example of a process flow 400 that supports neural-network-based link-level performance prediction in accordance with aspects of the present disclosure. In some examples, the process flow 400 may be implemented by aspects of the wireless communications systems 100 and 200. The process flow 400 may relate to one or more actions performed by a first device 405-*a* and a second device 405-*b*, which may be examples of a base station 105 described with reference to FIG. 1, a UE 115 described with reference to FIG. 1, a UE 215 described with reference to FIG. 2, or a base station 205 described with reference to FIG. 2. The process flow 400 may also involve one or more additional devices (not shown). Alternative examples of the following may be implemented, where some steps may be performed in a different order than described or may not be performed at all. In some examples, steps may include additional features not mentioned below, or further steps may be added.

At 410, the first device 405-*a* and the second device 405-*b* may identify a channel for communication. In some examples, one or both of the first device 405-*a* or the second device 405-*b* may identify the channel based on a scheduling grant. At 415, the second device 405-*b* may transmit one or more reference signals to the first device 405-*a*. The reference signals may include one or more of a DMRS, or a CSI-RS, among other examples.

In some examples, at 420 a transmission for the first device 405-*a* may be preempted by one more communications, such as URLLC traffic, intended for another device (not shown). In some examples, at 425 the second device 405-*b* may generate a packet for a wider band, but the second device 405-*b* may be unable to regenerate the packet for a subband that has lost channel access. The second device 405-*b* may puncture the generated packet on the subband by transmitting a portion of the generated packet.

At 430, The first device 405-*a* may determine one or more input parameters associated with the channel based on the reference signals. At 435, the first device 405-*a* may determine one or more neural network weights for the input parameters. The first device 405-*a* may train a neural network by assigning the neural network weights to the input parameters. In some examples, the neural network may be configured for one or both of offline training (for example, before the first device 405-*a* is deployed) or online training (for example, after the first device 405-*a* is deployed). In some examples, the neural network may be trained in the offline configuration based on one or more of collected data, simulations, or other information. In some examples, the first device 405-*a* may train the neural network in the online configuration based on one or more of collected data, measurements, metrics, or other information. The online training may reduce the complexity of implementing the neural network at the first device 405-*a*. In some examples, the neural network may undergo further training (or retraining) for further configuration to a specific environment or specific operating conditions (for example, based on one or more of additional reference signals received from the second device 405-b, channel degradation, a sudden burst of interference on the channel, an updated contention window, or other conditions).

At 440, the first device 405-a may estimate one or more link performance metrics based on the one or more neural network weights and the one or more input parameters. In some examples, the link performance metrics may include one or more predicted BLERs or other metrics for the channel. The first device 405-a may estimate link performance metrics associated with the reference signals.

At 445, the first device 405-a may transmit one or more feedback indicators to the second device 405-b based on the estimated link performance metrics. In some examples, the feedback indicators may include or indicate the predicted BLERs, alone or in combination with other examples of link performance metrics, for the channel. In some examples, the feedback indicators may include one or more of an ACK, a NACK, a downlink feedback information report, or a new data indicator, among other examples. In some examples, the feedback indicators may include an ACK or a NACK associated with the reference signals, as well as one or more feedback indicators associated with one or both of the punctured packet or the transmission preempted by the URLLC traffic. In some examples, the first device 405-a may aggregate or compress a quantity of feedback indicators before transmitting the one or more feedback indicators to the second device 405-b. For example, the first device 405-a may transmit a selected one or more feedback indicators from the quantity of feedback indicators, or the first device 405-a may transmit all of the quantity of feedback indicators.

At 450, the second device 405-b may determine one or more channel parameters associated with the channel based on the feedback indicators. In some examples, the second device 405-b may determine to adjust the transmission, which may include adjusting one or more of the input parameters, based on the feedback indicators. In some examples, at 455 the second device 405-b may update a contention window for communicating with the first device 405-a based on the feedback indicators associated with the reference signals, rather than based on the feedback indicators associated with the punctured packet. For example, the second device 405-b may update a backoff timer to adjust a duration between attempts to gain medium access (for example, using an LBT procedure) for the channel.

At 460, the second device 405-b may communicate with the first device 405-a over the channel, for example based on the updated contention window The operations performed by the first device 405-a and the second device 405-b may therefore support improvements to predicting link level performance at the first device 405-a and, in some examples, may promote improvements to the reliability of communications between the first device 405-a and the second device 405-b, among other benefits.

Figure 5:
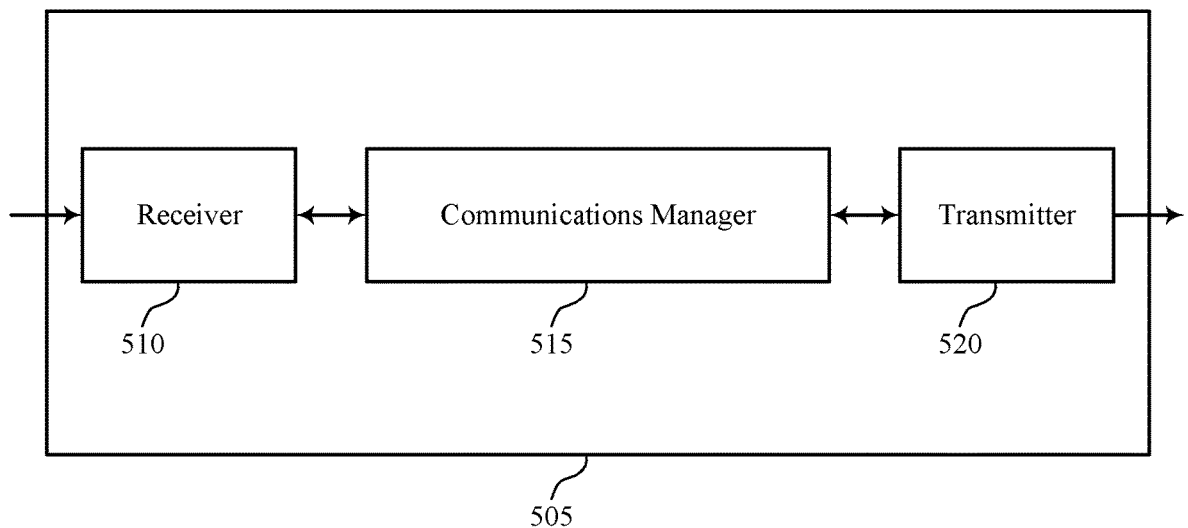
FIGS. 5 and 6 show block diagrams of devices that support neural-network-based link-level performance prediction in accordance with aspects of the present disclosure.

FIG. 5 shows a block diagram of a device 505 that supports neural-network-based link-level performance prediction in accordance with aspects of the present disclosure. The device 505 may be an example of aspects of a UE 115 or base station 105 as described herein. The device 505 may include a receiver 510, a communications manager 515, and a transmitter 520. The communications manager 515 can be implemented, at least in part, by one or both of a modem and a processor. Each of these components may be in communication with one another (for example, via one or more buses).

The receiver 510 may receive information such as packets, user data, or control information associated with various information channels (for example, control channels, data channels, and information related to neural-network-based link-level performance prediction). Information may be passed on to other components of the device 505. The receiver 510 may be an example of aspects of the transceiver 820 or 920 described with reference to FIGS. 8 and 9. The receiver 510 may utilize a single antenna or a set of antennas.

The communications manager 515 may identify, at a first device, a channel for communicating with a second device, determine one or more neural network weights associated with one or more input parameters associated with the channel, estimate one or more link performance metrics associated with the channel from one or more reference signals based on the one or more neural network weights and the one or more input parameters, and transmit, to the second device, one or more feedback indicators associated with the channel based on the one or more link performance metrics. The actions performed by the communications manager 515 as described herein may be implemented to realize one or more potential advantages. Some implementations may allow a device to save power and increase battery life by communicating with a network equipment more efficiently. For example, a first device may more efficiently obtain information transmitted by a second device in DL transmissions as the first device may be able to indicate favorable channel parameters that may improve decoding reliability at the first device. In such implementations, the first device may increase the likelihood of a successful decoding procedure of the DL transmission by improving the reliability of the channel. Implementations may additionally or alternatively provide improved quality and reliability of service at the first device as latency and the number of separate resources allocated to the first device may be reduced. The communications manager 515 may be an example of aspects of the communications manager 810 or 910 as described herein.

The communications manager 515, or its sub-components, may be implemented in hardware, code (for example, software or firmware) executed by a processor, or any combination thereof. If implemented in code executed by a processor, the functions of the communications manager 515, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 515, or its sub-components, may be physically located at different locations, including being distributed such that portions of functions are implemented at different physical locations by one or more physical components. In some examples, the communications manager 515, or its sub-components, may be a separate and distinct component in accordance with various aspects of the present disclosure. In some examples, the communications manager 515, or its sub-components, may be combined with one or more other hardware components, including but not limited to one or more of an input/output (I/O) component, a transceiver, a network server, another computing device, or one or more other components described in the present disclosure in accordance with various aspects of the present disclosure.

The transmitter 520 may transmit signals generated by other components of the device 505. In some examples, the transmitter 520 may be collocated with a receiver 510 in a transceiver component. For example, the transmitter 520 may be an example of aspects of the transceiver 820 or 920 described with reference to FIGS. 8 and 9. The transmitter 520 may utilize a single antenna or a set of antennas.

Figure 6:
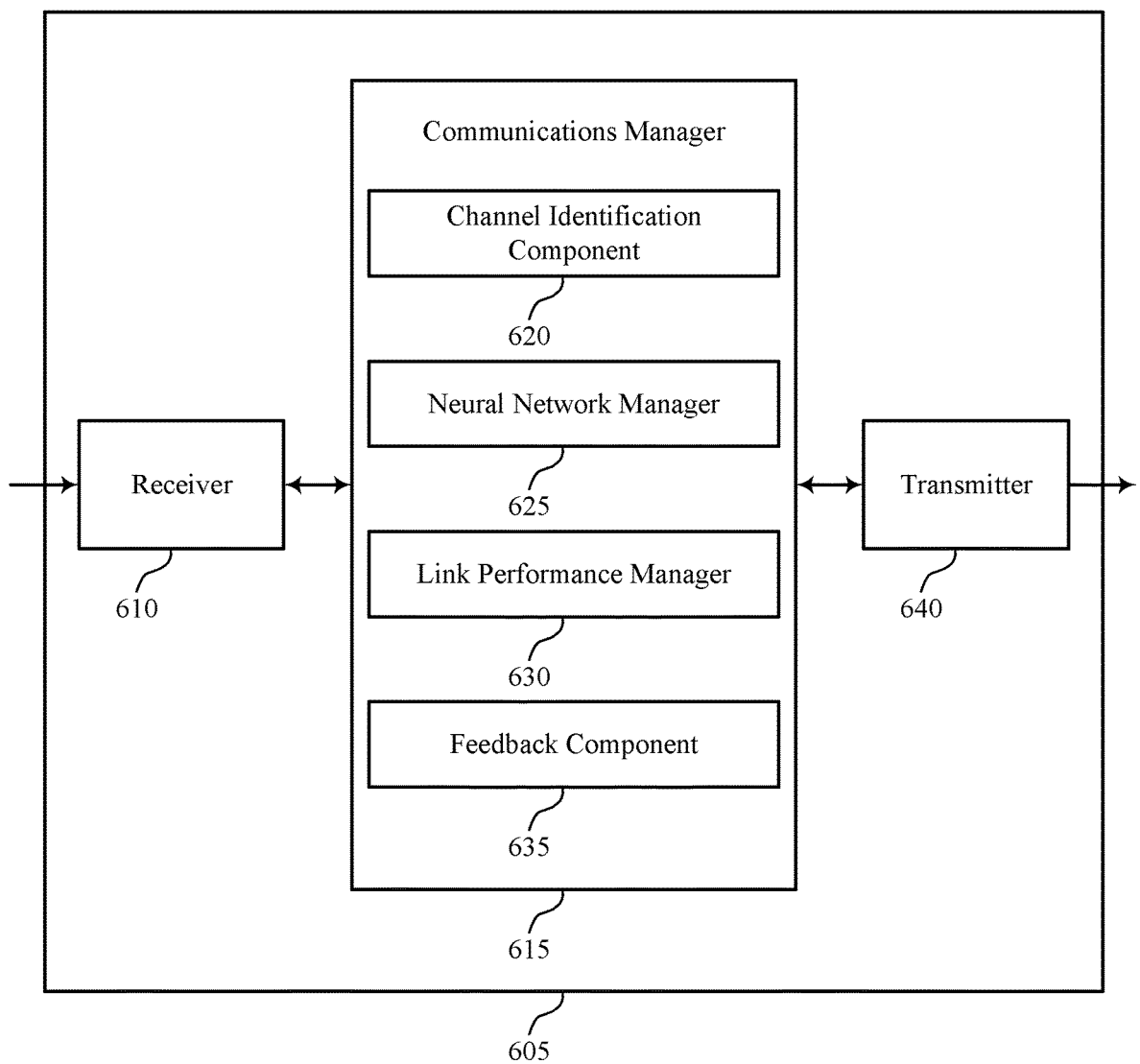

FIG. 6 shows a block diagram of a device 605 that supports neural-network-based link-level performance prediction in accordance with aspects of the present disclosure. The device 605 may be an example of aspects of a device 505, a UE 115, or a base station 105 as described herein. The device 605 may include a receiver 610, a communications manager 615, and a transmitter 640. The communications manager 615 can be implemented, at least in part, by one or both of a modem and a processor. Each of these components may be in communication with one another (for example, via one or more buses).

The receiver 610 may receive information such as packets, user data, or control information associated with various information channels (for example, control channels, data channels, and information related to neural-network-based link-level performance prediction). Information may be passed on to other components of the device 605. The receiver 610 may be an example of aspects of the transceiver 820 or 920 as described with reference to FIGS. 8 and 9. The receiver 610 may utilize a single antenna or a set of antennas.

The communications manager 615 may be an example of aspects of the communications manager 515 as described herein. The communications manager 615 may include a channel identification component 620, a neural network manager 625, a link performance manager 630, and a feedback component 635. The communications manager 615 may be an example of aspects of the communications manager 810 or 910 as described herein.

The channel identification component 620 may identify, at a first device, a channel for communicating with a second device.

The neural network manager 625 may determine one or more neural network weights associated with one or more input parameters associated with the channel.

The link performance manager 630 may estimate one or more link performance metrics associated with the channel from one or more reference signals based on the one or more neural network weights and the one or more input parameters.

The feedback component 635 may transmit, to the second device, one or more feedback indicators associated with the channel based on the one or more link performance metrics.

The transmitter 640 may transmit signals generated by other components of the device 605. In some examples, the transmitter 640 may be collocated with a receiver 610 in a transceiver component. For example, the transmitter 640 may be an example of aspects of the transceiver 820 or 920 as described with reference to FIGS. 8 and 9. The transmitter 640 may utilize a single antenna or a set of antennas.

Figure 7:
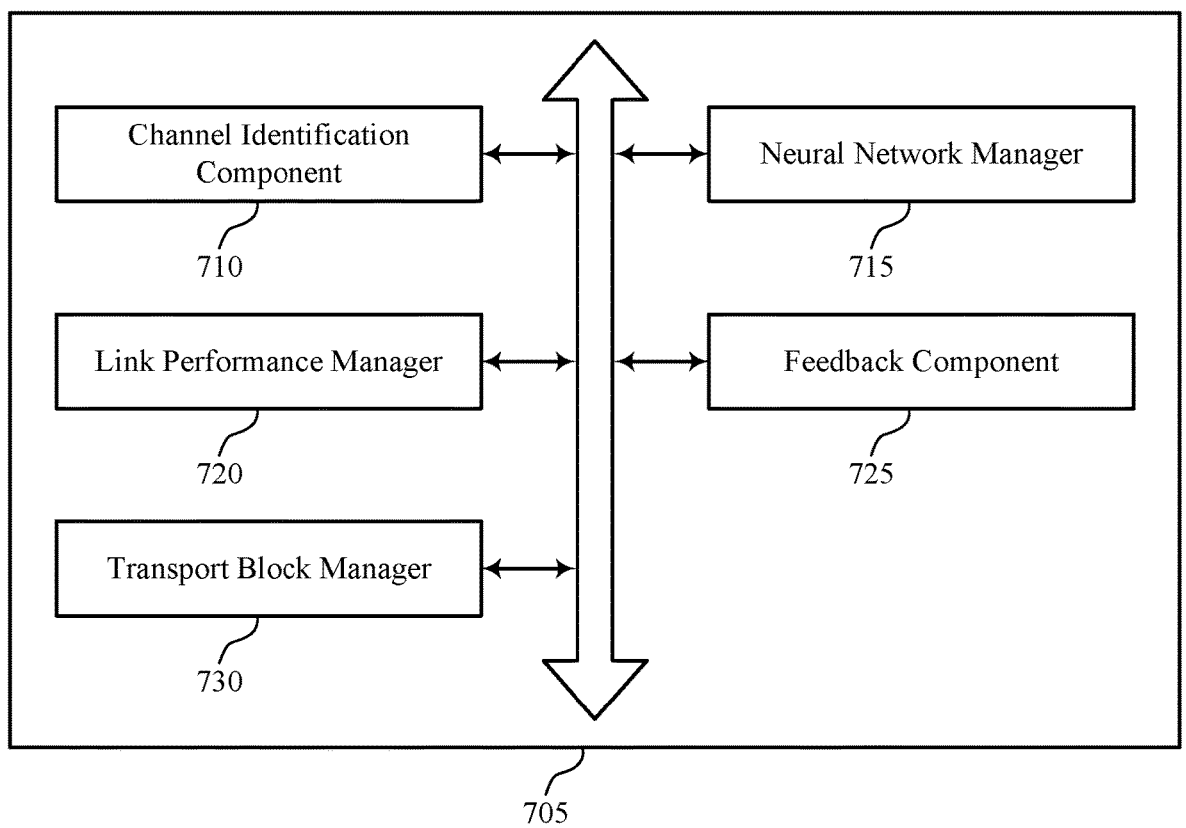
FIG. 7 shows a block diagram of a communications manager that supports neural-network-based link-level performance prediction in accordance with aspects of the present disclosure.

FIG. 7 shows a block diagram of a communications manager 705 that supports neural-network-based link-level performance prediction in accordance with aspects of the present disclosure. The communications manager 705 may be an example of aspects of a communications manager 515, a communications manager 615, a communications manager 810, or a communications manager 910 described herein. The communications manager 705 may include a channel identification component 710, a neural network manager 715, a link performance manager 720, a feedback component 725, and a transport block manager 730. Each of these components may communicate, directly or indirectly, with one another (for example, via one or more buses).

The channel identification component 710 may identify, at a first device, a channel for communicating with a second device. In some examples, the one or more input parameters associated with the channel may include one or more of a modulation and coding scheme, a rank, a precoding matrix indicator, an estimated Doppler measurement, an interference variance estimation, a noise variance estimation, a decoder feature, or a hybrid automatic repeat request.

The neural network manager 715 may determine one or more neural network weights associated with one or more input parameters associated with the channel.

The link performance manager 720 may estimate one or more link performance metrics associated with the channel from one or more reference signals based on the one or more neural network weights and the one or more input parameters. In some examples, the link performance manager 720 may estimate the one or more link performance metrics based on one or more of a demodulation reference signal or a channel state information reference signal. In some examples, the one or more link performance metrics may include one or more of a block error rate associated with the channel, a throughput associated with the channel, a spectrum efficiency associated with the channel, or a scaled value representing a link performance. In some examples, the block error rate may be associated with a modulation and coding scheme of the channel. In some examples, each link performance metric of the one or more link performance metrics may correspond to a respective modulation and coding scheme.

The feedback component 725 may transmit, to the second device, one or more feedback indicators associated with the channel based on the one or more link performance metrics. In some examples, the one or more feedback indicators may include one or more of one or more acknowledgments, one or more negative acknowledgments, one or more precoding matrix indicators, one or more rank indicators, one or more channel quality indicators, one or more channel state information reports, one or more downlink feedback information, or one or more new data indicators. In some examples, each feedback indicator of the one or more feedback indicators may correspond to a respective transmission-reception point, a respective panel, or a respective beam associated with the second device. In some examples, the feedback component 725 may transmit, to the second device, one or more additional feedback indicators associated with the channel based on one or more of a punctured packet from the second device or a transmission from the second device preempted by an ultra-reliable low-latency communication intended for a third device.

The transport block manager 730 may receive a transport block from the second device based on the one or more feedback indicators. In some examples, the transport block manager 730 may initiate decoding of the transport block based on the one or more link performance metrics. In some examples, the transport block manager 730 may determine not to decode the transport block based on the one or more link performance metrics, in which the one or more feedback indicators include a negative acknowledgment. In some examples, the transport block manager 730 may decode one or more initial code blocks of the transport block. In some examples, the transport block manager 730 may determine not to decode one or more later code blocks of the transport block based on the one or more link performance metrics. In some examples, the transport block manager 730 may determine a set of repetitions of the transport block in one or more of a frequency domain, a time domain, or a spatial domain. In some examples, the transport block manager 730 may decode one or more of the set of repetitions of the transport block based on the one or more link performance metrics.

Figure 8:
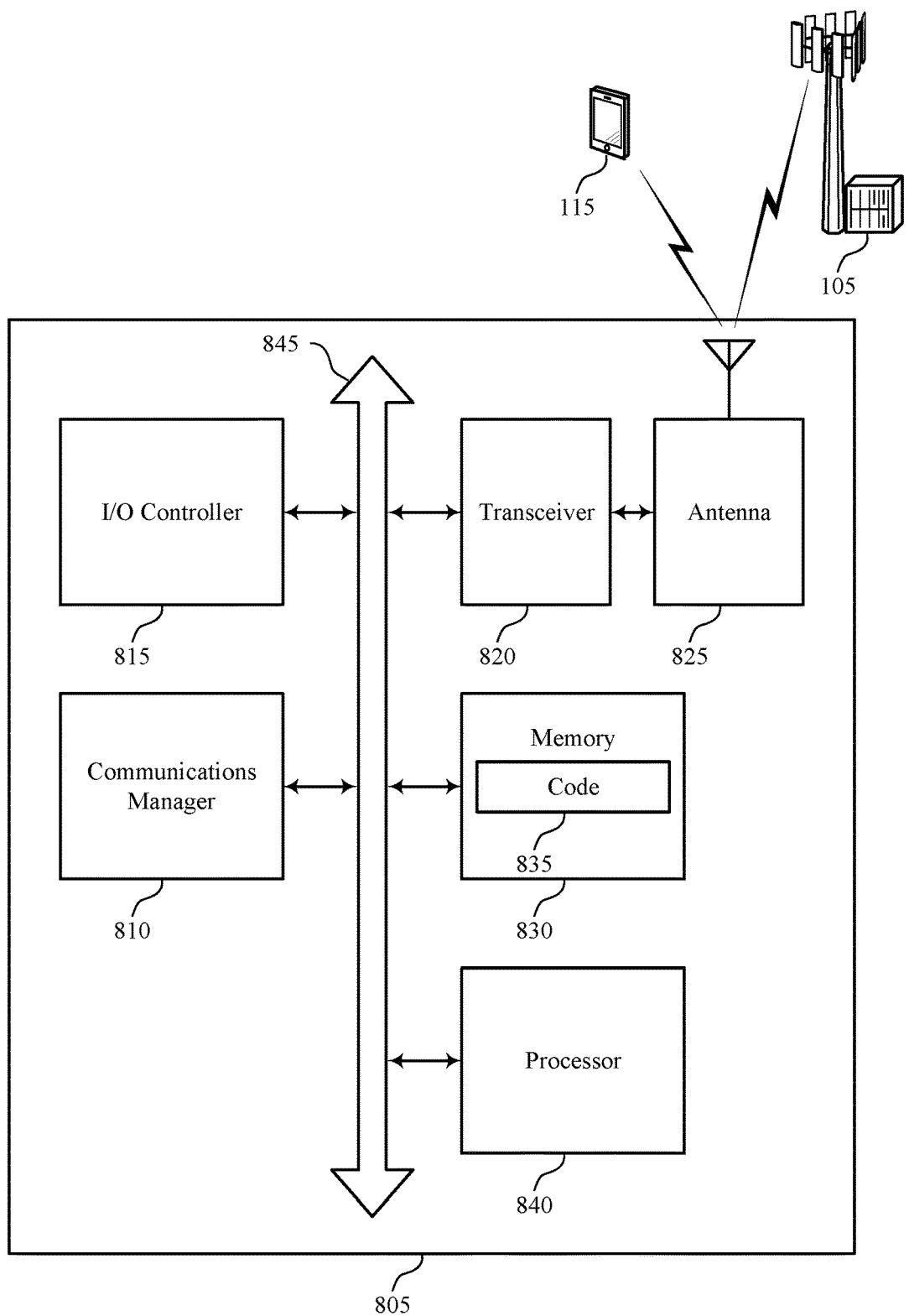
FIGS. 8 and 9 show diagrams of systems including devices that support neural-network-based link-level performance prediction in accordance with aspects of the present disclosure.

FIG. 8 shows a diagram of a system including a device 805 that supports neural-network-based link-level performance prediction in accordance with aspects of the present disclosure. The device 805 may be an example of or include the components of device 505, device 605, or a UE 115 as described herein. The device 805 may include components for bi-directional voice and data communications including components for transmitting and receiving communications, including a communications manager 810, an I/O controller 815, a transceiver 820, an antenna 825, memory 830, and a processor 840. These components may be in electronic communication via one or more buses (for example, bus 845).

The communications manager 810 may identify, at a first device, a channel for communicating with a second device, determine one or more neural network weights associated with one or more input parameters associated with the channel, estimate one or more link performance metrics associated with the channel from one or more reference signals based on the one or more neural network weights and the one or more input parameters, and transmit, to the second device, one or more feedback indicators associated with the channel based on the one or more link performance metrics.

The I/O controller 815 may manage input and output signals for the device 805. The I/O controller 815 may also manage peripherals not integrated into the device 805. In some examples, the I/O controller 815 may represent a physical connection or port to an external peripheral. In some examples, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some examples, the I/O controller 815 may be implemented as part of a processor. In some examples, a user may interact with the device 805 via the I/O controller 815 or via hardware components controlled by the I/O controller 815.

The transceiver 820 may communicate bi-directionally, via one or more antennas, wired, or wireless links as described above. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some examples, the wireless device may include a single antenna 825. However, in some examples the device may have more than one antenna 825, which may be capable of concurrently transmitting or receiving multiple wireless transmissions.

The memory 830 may include one or more of random-access memory (RAM) or read-only memory (ROM). The memory 830 may store computer-readable, computer-executable code 835 including instructions that, when executed, cause the processor to perform various functions described herein. In some examples, the memory 830 may contain, among other things, a basic input/output system (BIOS) which may control basic hardware or software operation such as the interaction with peripheral components or devices.

The processor 840 may include an intelligent hardware device (for example, a general-purpose processor, a DSP, a central processing unit (CPU), a microcontroller, an ASIC, an FPGA, a programmable logic device, a discrete gate or transistor logic component, a discrete hardware component, or any combination thereof). In some examples, the processor 840 may be configured to operate a memory array using a memory controller. In other cases, a memory controller may be integrated into the processor 840. The processor 840 may be configured to execute computer-readable instructions stored in a memory (for example, the memory 830) to cause the device 805 to perform various functions (for example, functions or tasks supporting neural-network-based link-level performance prediction).

The code 835 may include instructions to implement aspects of the present disclosure, including instructions to support wireless communications. The code 835 may be stored in a non-transitory computer-readable medium such as system memory or other type of memory. In some examples, the code 835 may not be directly executable by the processor 840 but may cause a computer (for example, when compiled and executed) to perform functions described herein.

Figure 9:
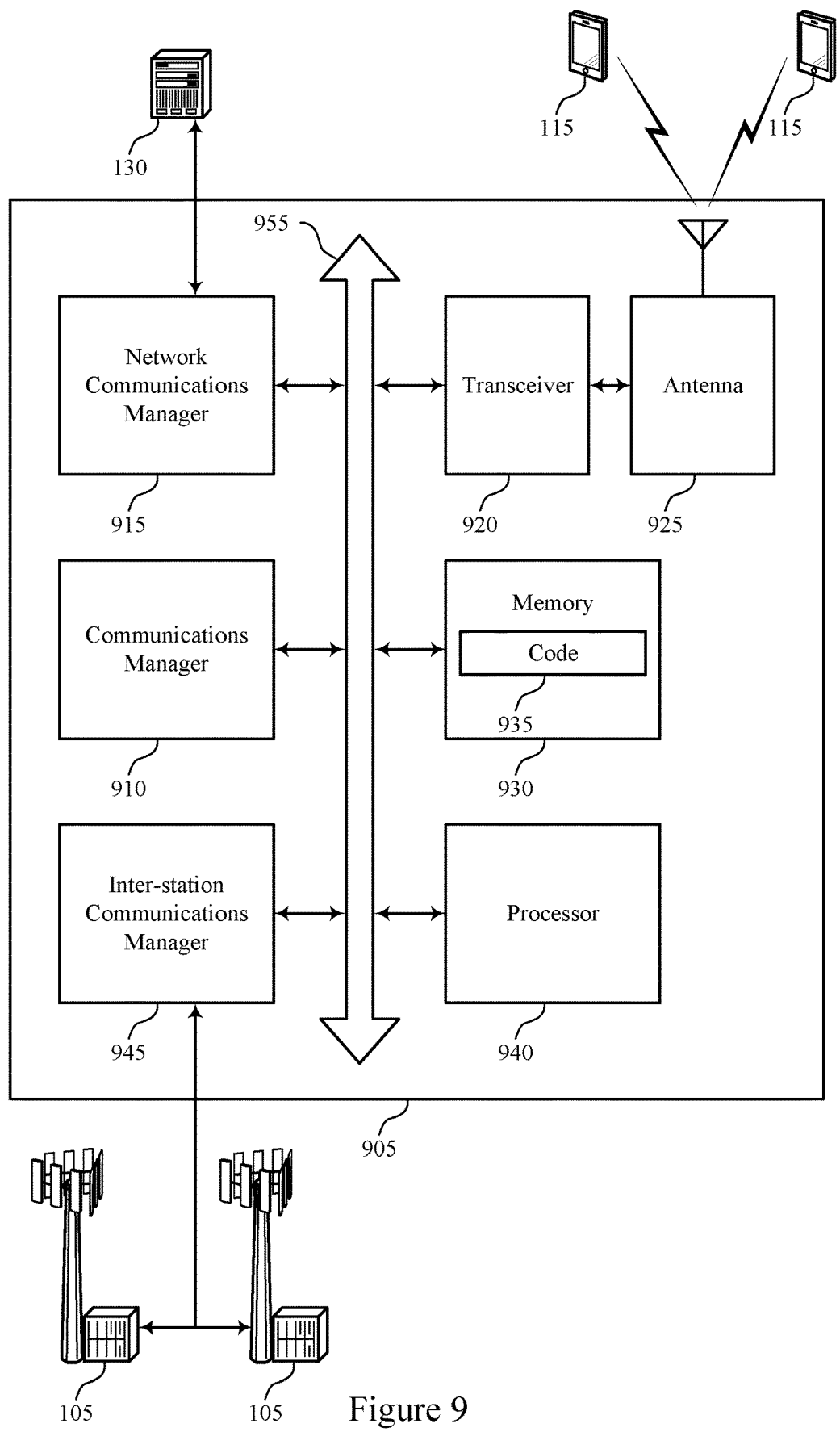

FIG. 9 shows a diagram of a system including a device 905 that supports neural-network-based link-level performance prediction in accordance with aspects of the present disclosure. The device 905 may be an example of or include the components of device 505, device 605, or a base station 105 as described herein. The device 905 may include components for bi-directional voice and data communications including components for transmitting and receiving communications, including a communications manager 910, a network communications manager 950, a transceiver 920, an antenna 925, memory 930, a processor 940, and an inter-station communications manager 955. These components may be in electronic communication via one or more buses (for example, bus 945).

The communications manager 910 may identify, at a second device, a channel for communicating with a first device, receive, from the first device, one or more feedback indicators associated with the channel and based on one or more link performance metrics, determine one or more parameters of the channel based on the one or more feedback indicators, and communicate, with the first device, based on determining the one or more parameters of the channel.

Network communications manager 950 may manage communications with the core network (for example, via one or more wired backhaul links). For example, the network communications manager 950 may manage the transfer of data communications for client devices, such as one or more UEs 115.

Transceiver 920 may communicate bi-directionally, via one or more antennas, wired, or wireless links as described above. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some examples, the wireless device may include a single antenna 925. However, in some examples the device may have more than one antenna 925, which may be capable of concurrently transmitting or receiving multiple wireless transmissions.

The memory 930 may include one or more of RAM or ROM. The memory 930 may store computer-readable code 935 including instructions that, when executed by a processor (for example, the processor 940) cause the device to perform various functions described herein. In some examples, the memory 930 may contain, among other things, a BIOS which may control basic hardware or software operation such as the interaction with peripheral components or devices.

The processor 940 may include an intelligent hardware device (for example, a general-purpose processor, a DSP, a CPU, a microcontroller, an ASIC, an FPGA, a programmable logic device, a discrete gate or transistor logic component, a discrete hardware component, or any combination thereof). In some examples, the processor 940 may be configured to operate a memory array using a memory controller. In other cases, a memory controller may be integrated into the processor 940. The processor 940 may be configured to execute computer-readable instructions stored in a memory (for example, the memory 930) to cause the device 905 to perform various functions (for example, functions or tasks supporting neural-network-based link-level performance prediction).

Inter-station communications manager 955 may manage communications with other base station 105, and may include a controller or scheduler for controlling communications with UEs 115 in cooperation with other base stations 105. For example, the inter-station communications manager 955 may coordinate scheduling for transmissions to UEs 115 for various interference mitigation techniques such as beamforming or joint transmission. In some examples, inter-station communications manager 955 may provide an X2 interface within an LTE/LTE-A wireless communication network technology to provide communication between base stations 105.

The code 935 may include instructions to implement aspects of the present disclosure, including instructions to support wireless communications. The code 935 may be stored in a non-transitory computer-readable medium such as system memory or other type of memory. In some examples, the code 935 may not be directly executable by the processor 940 but may cause a computer (for example, when compiled and executed) to perform functions described herein.

Figure 10:
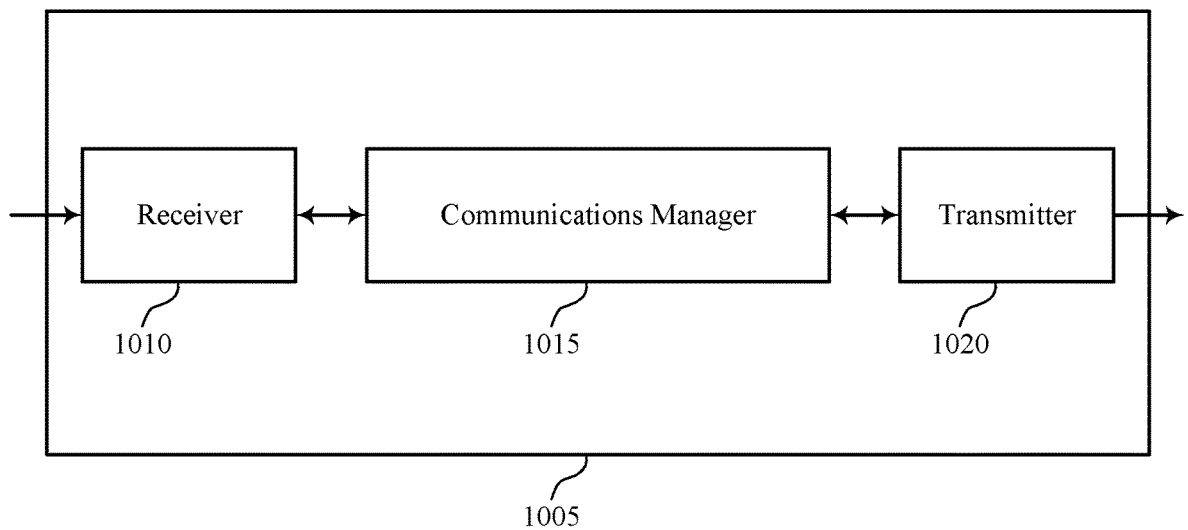
FIGS. 10 and 11 show block diagrams of devices that support neural-network-based link-level performance prediction in accordance with aspects of the present disclosure.

FIG. 10 shows a block diagram of a device 1005 that supports neural-network-based link-level performance prediction in accordance with aspects of the present disclosure. The device 1005 may be an example of aspects of a UE 115 or base station 105 as described herein. The device 1005 may include a receiver 1010, a communications manager 1015, and a transmitter 1020. The communications manager 1015 can be implemented, at least in part, by one or both of a modem and a processor. Each of these components may be in communication with one another (for example, via one or more buses).

Receiver 1010 may receive information such as packets, user data, or control information associated with various information channels (for example, control channels, data channels, and information related to neural-network-based link-level performance prediction). Information may be passed on to other components of the device 1005. The receiver 1010 may be an example of aspects of the transceiver 1320 or 1420 as described with reference to FIGS. 13 and 14. The receiver 1010 may utilize a single antenna or a set of antennas.

The communications manager 1015 may identify, at a second device, a channel for communicating with a first device, receive, from the first device, one or more feedback indicators associated with the channel and based on one or more link performance metrics, determine one or more parameters of the channel based on the one or more feedback indicators, and communicate, with the first device, based on determining the one or more parameters of the channel. The communications manager 1015 as described herein may be implemented to realize one or more potential advantages. Some implementations may allow the device 1005 to save power by communicating with a first device more efficiently. For example, the device 1005 may improve the reliability of communications with a first device as the device 1005 may be able to adjust a transmission to increase the likelihood of the first device successfully receiving the transmission from the device 1005. The communications manager 1015 may be an example of aspects of the communications manager 1310 or 1410 as described herein.

The communications manager 1015, or its sub-components, may be implemented in hardware, code (for example, software or firmware) executed by a processor, or any combination thereof. If implemented in code executed by a processor, the functions of the communications manager 1015, or its sub-components may be executed by a general-purpose processor, a DSP, an ASIC, a FPGA or other programmable logic device, discrete gate or transistor logic, discrete hardware components, or any combination thereof designed to perform the functions described in the present disclosure.

The communications manager 1015, or its sub-components, may be physically located at different locations, including being distributed such that portions of functions are implemented at different physical locations by one or more physical components. In some examples, the communications manager 1015, or its sub-components, may be a separate and distinct component in accordance with various aspects of the present disclosure. In some examples, the communications manager 1015, or its sub-components, may be combined with one or more other hardware components, including but not limited to one or more of an input/output (I/O) component, a transceiver, a network server, another computing device, or one or more other components described in the present disclosure in accordance with various aspects of the present disclosure.

Transmitter 1020 may transmit signals generated by other components of the device 1005. In some examples, the transmitter 1020 may be collocated with a receiver 1010 in a transceiver component. For example, the transmitter 1020 may be an example of aspects of the transceiver 1320 or 1420 as described with reference to FIGS. 13 and 14. The transmitter 1020 may utilize a single antenna or a set of antennas.

Figure 11:
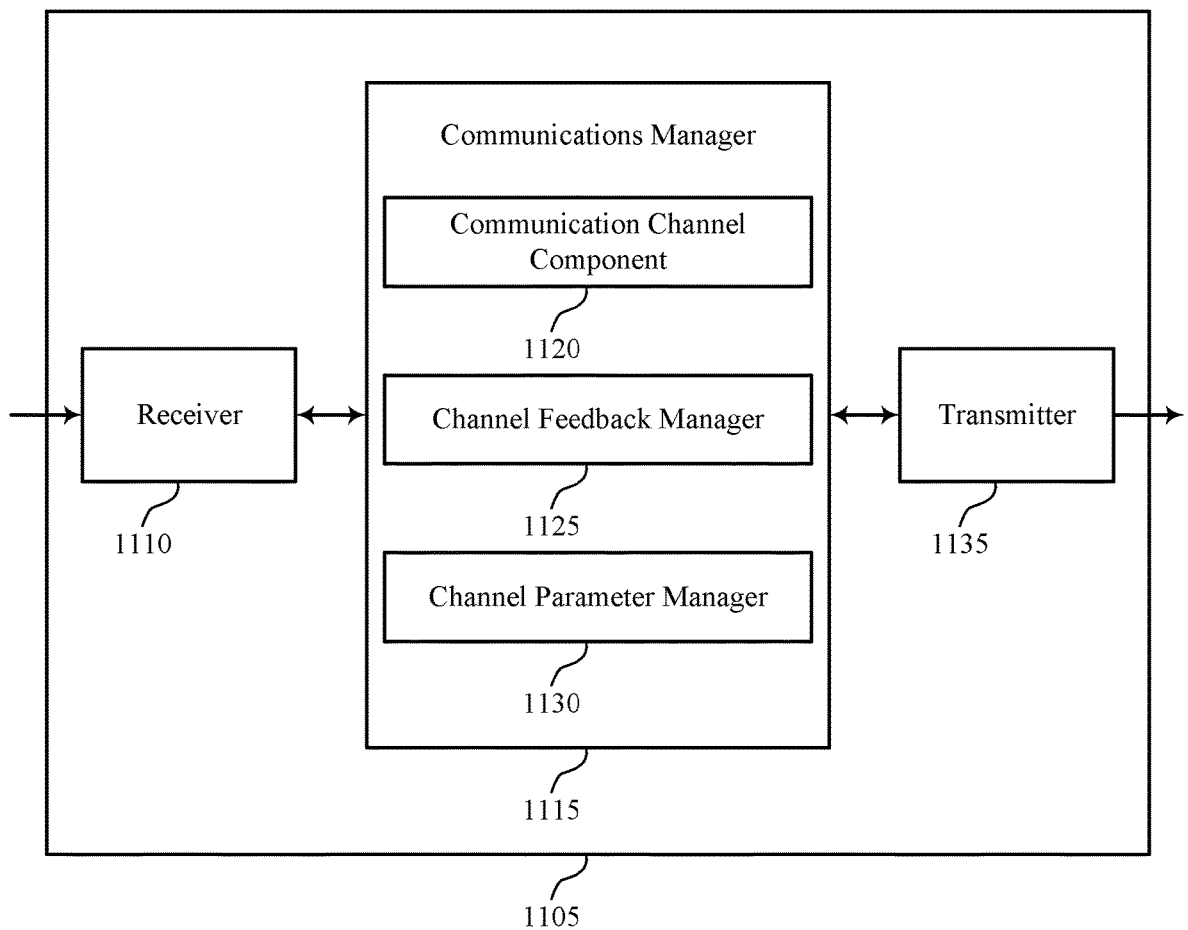

FIG. 11 shows a block diagram of a device 1105 that supports neural-network-based link-level performance prediction in accordance with aspects of the present disclosure. The device 1105 may be an example of aspects of a device 1005, a UE 115, or a base station 105 as described herein. The device 1105 may include a receiver 1110, a communications manager 1115, and a transmitter 1135. The communications manager 1115 can be implemented, at least in part, by one or both of a modem and a processor. Each of these components may be in communication with one another (for example, via one or more buses).

Receiver 1110 may receive information such as packets, user data, or control information associated with various information channels (for example, control channels, data channels, and information related to neural-network-based link-level performance prediction). Information may be passed on to other components of the device 1105. The receiver 1110 may be an example of aspects of the transceiver 1320 or 1420 as described with reference to FIGS. 13 and 14. The receiver 1110 may utilize a single antenna or a set of antennas.

The communications manager 1115 may be an example of aspects of the communications manager 1015 as described herein. The communications manager 1115 may include a communication channel component 1120, a channel feedback manager 1125, and a channel parameter manager 1130. The communications manager 1115 may be an example of aspects of the communications manager 1310 or 1410 as described herein.

The communication channel component 1120 may identify, at a second device, a channel for communicating with a first device and communicate, with the first device, based on determining the one or more parameters of the channel.

The channel feedback manager 1125 may receive, from the first device, one or more feedback indicators associated with the channel and based on one or more link performance metrics.

The channel parameter manager 1130 may determine one or more parameters of the channel based on the one or more feedback indicators.

Transmitter 1135 may transmit signals generated by other components of the device 1105. In some examples, the transmitter 1135 may be collocated with a receiver 1110 in a transceiver component. For example, the transmitter 1135 may be an example of aspects of the transceiver 1320 or 1420 as described with reference to FIGS. 13 and 14. The transmitter 1135 may utilize a single antenna or a set of antennas.

Figure 12:
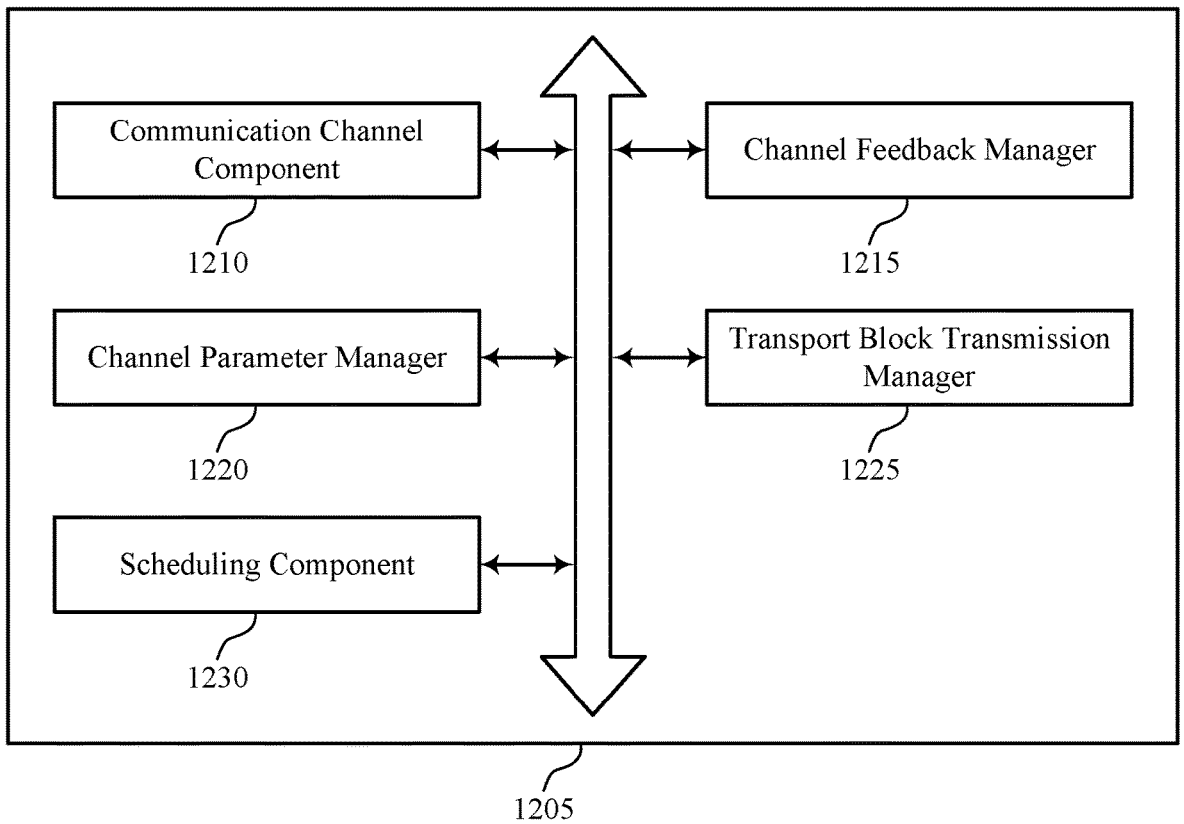
FIG. 12 shows a block diagram of a communications manager that supports neural-network-based link-level performance prediction in accordance with aspects of the present disclosure.

FIG. 12 shows a block diagram of a communications manager 1205 that supports neural-network-based link-level performance prediction in accordance with aspects of the present disclosure. The communications manager 1205 may be an example of aspects of a communications manager 1015, a communications manager 1115, a communications manager 1310, or a communications manager 1410 described herein. The communications manager 1205 may include a communication channel component 1210, a channel feedback manager 1215, a channel parameter manager 1220, a transport block transmission manager 1225, and a scheduling component 1230. Each of these components may communicate, directly or indirectly, with one another (for example, via one or more buses).

The communication channel component 1210 may identify, at a second device, a channel for communicating with a first device. In some examples, the communication channel component 1210 may communicate, with the first device, based on determining the one or more parameters of the channel.

The channel feedback manager 1215 may receive, from the first device, one or more feedback indicators associated with the channel and based on one or more link performance metrics. In some examples, the one or more link performance metrics may include one or more of a block error rate associated with the channel, a throughput associated with the channel, a spectrum efficiency associated with the channel, or a scaled value representing a link performance. In some examples, the block error rate may be associated with a modulation and coding scheme of the channel. In some examples, the one or more link performance metrics may be based on one or more of a demodulation reference signal or a channel state information reference signal. In some examples, the one or more feedback indicators may include one or more of one or more acknowledgments, one or more negative acknowledgments, one or more precoding matrix indicators, one or more rank indicators, one or more channel quality indicators, one or more channel state information reports, one or more downlink feedback information, one or more new data indicators, or one or more additional feedback indicators based a on one or more of a punctured packet from the second device or a transmission from the second device preempted by an ultra-reliable low-latency communication intended for a third device. In some examples, each feedback indicator of the one or more feedback indicators may correspond to a respective transmission-reception point of one or more transmission-reception points, a respective panel of one or more panels, or a respective beam associated with the second device of one or more beams.

The channel parameter manager 1220 may determine one or more parameters of the channel based on the one or more feedback indicators. In some examples, the one or more parameters of the channel may include one or more of a modulation and coding scheme, a rank, a precoding matrix indicator, an estimated Doppler measurement, an interference variance estimation, a noise variance estimation, a decoder feature, or a hybrid automatic repeat request.

The transport block transmission manager 1225 may transmit a transport block to the first device based on determining the one or more parameters of the channel. In some examples, the transport block transmission manager 1225 may transmit a set of repetitions of the transport block in one or more of a frequency domain, a time domain, or a spatial domain. In some examples, the transport block transmission manager 1225 may determine a quantity of repetitions of the transport block based on determining the one or more parameters of the channel, in which transmitting the set of repetitions of the transport block is based on determining the quantity of repetitions.

The scheduling component 1230 may determine a transmission-reception point of the one or more transmission-reception points, a panel of the one or more panels, or a beam of the one or more beams for later scheduling based on determining the one or more parameters of the channel, in which communicating with the first device is based on determining the transmission-reception point, the panel, or the beam for later scheduling.

Figure 13:
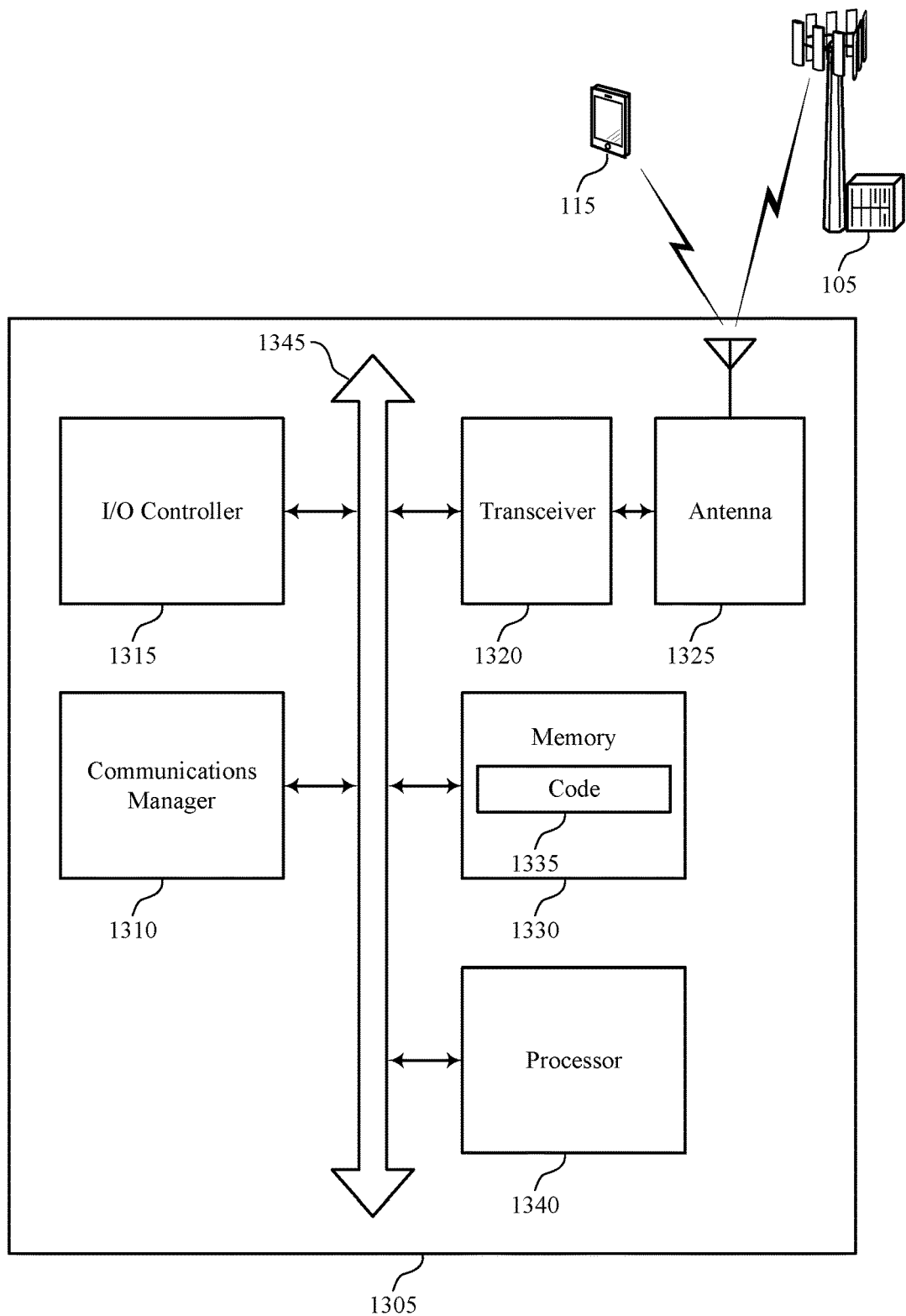
FIGS. 13 and 14 show diagrams of systems including devices that support neural-network-based link-level performance prediction in accordance with aspects of the present disclosure.

FIG. 13 shows a diagram of a system including a device 1305 that supports neural-network-based link-level performance prediction in accordance with aspects of the present disclosure. The device 1305 may be an example of or include the components of device 1005, device 1105, or UE 115 as described herein. The device 1305 may include components for bi-directional voice and data communications including components for transmitting and receiving communications, including a communications manager 1310, a transceiver 1320, an antenna 1325, memory 1330, a processor 1340, and an I/O controller 1315. These components may be in electronic communication via one or more buses (for example, bus 1345).

The communications manager 1310 may identify, at a second device, a channel for communicating with a first device, receive, from the first device, one or more feedback indicators associated with the channel and based on one or more link performance metrics, determine one or more parameters of the channel based on the one or more feedback indicators, and communicate, with the first device, based on determining the one or more parameters of the channel.

Transceiver 1320 may communicate bi-directionally, via one or more antennas, wired, or wireless links as described above. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some examples, the wireless device may include a single antenna 1325. However, in some examples the device may have more than one antenna 1325, which may be capable of concurrently transmitting or receiving multiple wireless transmissions.

The memory 1330 may include one or more of RAM or ROM. The memory 1330 may store computer-readable code 1335 including instructions that, when executed by a processor (for example, the processor 1340) cause the device to perform various functions described herein. In some examples, the memory 1330 may contain, among other things, a BIOS which may control basic hardware or software operation such as the interaction with peripheral components or devices.

The processor 1340 may include an intelligent hardware device (for example, a general-purpose processor, a DSP, a CPU, a microcontroller, an ASIC, an FPGA, a programmable logic device, a discrete gate or transistor logic component, a discrete hardware component, or any combination thereof). In some examples, the processor 1340 may be configured to operate a memory array using a memory controller. In other cases, a memory controller may be integrated into the processor 1340. The processor 1340 may be configured to execute computer-readable instructions stored in a memory (for example, the memory 1330) to cause the device 1305 to perform various functions (for example, functions or tasks supporting neural-network-based link-level performance prediction).

The I/O controller 1315 may manage input and output signals for the device 1305. The I/O controller 1315 may also manage peripherals not integrated into the device 1305. In some examples, the I/O controller 1315 may represent a physical connection or port to an external peripheral. In some examples, the I/O controller 1315 may utilize an operating system such as iOS®, ANDROID®, MS-DOS®, MS-WINDOWS®, OS/2®, UNIX®, LINUX®, or another known operating system. In other cases, the I/O controller 1315 may represent or interact with a modem, a keyboard, a mouse, a touchscreen, or a similar device. In some examples, the I/O controller 1315 may be implemented as part of a processor. In some examples, a user may interact with the device 1305 via the I/O controller 1315 or via hardware components controlled by the I/O controller 1315.

The code 1335 may include instructions to implement aspects of the present disclosure, including instructions to support wireless communications. The code 1335 may be stored in a non-transitory computer-readable medium such as system memory or other type of memory. In some examples, the code 1335 may not be directly executable by the processor 1340 but may cause a computer (for example, when compiled and executed) to perform functions described herein.

Figure 14:
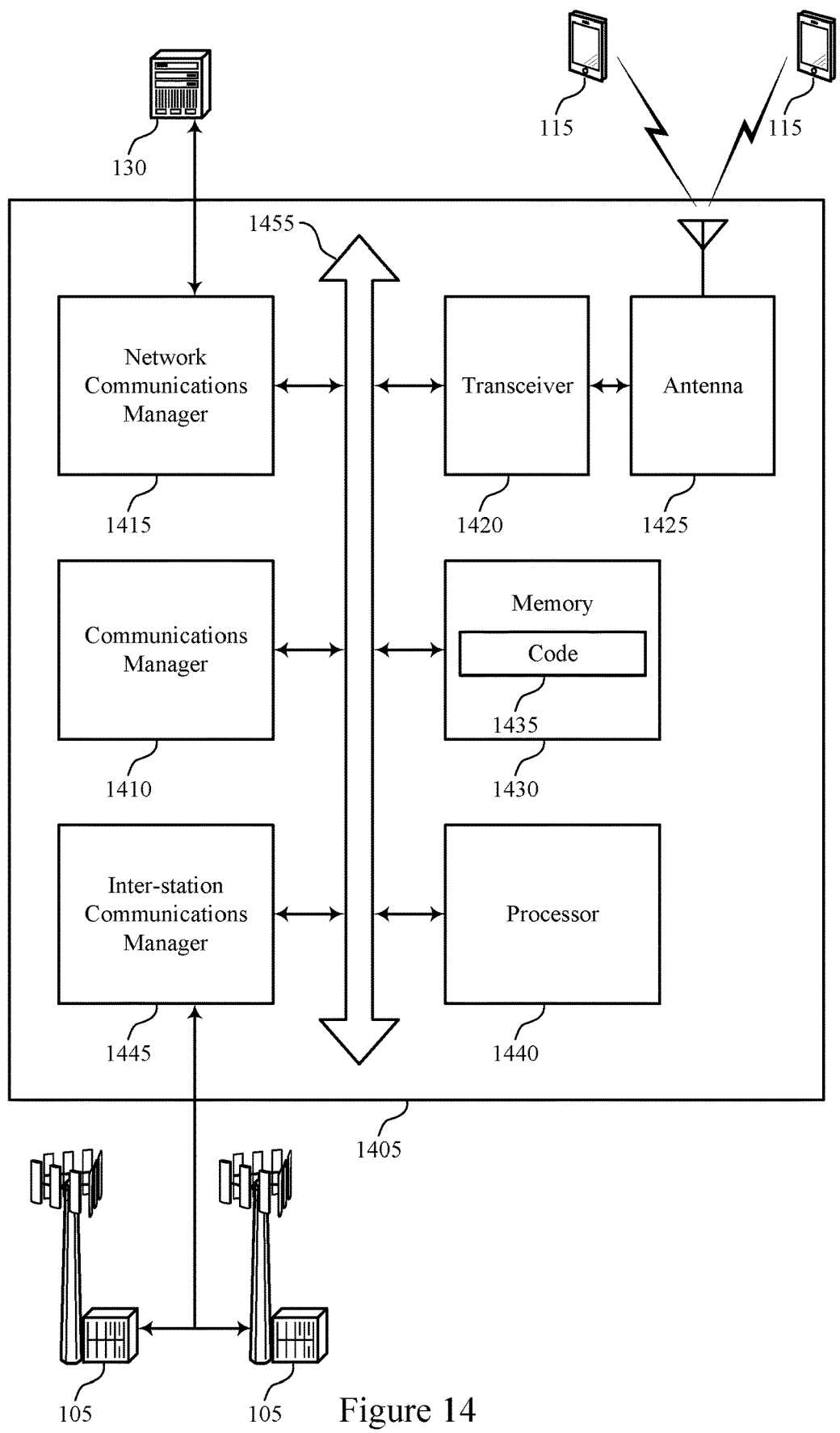

FIG. 14 shows a diagram of a system including a device 1405 that supports neural-network-based link-level performance prediction in accordance with aspects of the present disclosure. The device 1405 may be an example of or include the components of device 1005, device 1105, or a base station 105 as described herein. The device 1405 may include components for bi-directional voice and data communications including components for transmitting and receiving communications, including a communications manager 1410, a network communications manager 1450, a transceiver 1420, an antenna 1425, memory 1430, a processor 1440, and an inter-station communications manager 1455. These components may be in electronic communication via one or more buses (for example, bus 1445).

The communications manager 1410 may identify, at a second device, a channel for communicating with a first device, receive, from the first device, one or more feedback indicators associated with the channel and based on one or more link performance metrics, and determine one or more parameters of the channel based on the one or more feedback indicators, and communicate, with the first device, based on determining the one or more parameters of the channel.

Network communications manager 1450 may manage communications with the core network (for example, via one or more wired backhaul links). For example, the network communications manager 1450 may manage the transfer of data communications for client devices, such as one or more UEs 115.

Transceiver 1420 may communicate bi-directionally, via one or more antennas, wired, or wireless links as described above. For example, the transceiver 1420 may represent a wireless transceiver and may communicate bi-directionally with another wireless transceiver. The transceiver 1420 may also include a modem to modulate the packets and provide the modulated packets to the antennas for transmission, and to demodulate packets received from the antennas.

In some examples, the wireless device may include a single antenna 1425. However, in some examples the device may have more than one antenna 1425, which may be capable of concurrently transmitting or receiving multiple wireless transmissions.

The memory 1430 may include one or more of RAM or ROM. The memory 1430 may store computer-readable code 1435 including instructions that, when executed by a processor (for example, the processor 1440) cause the device to perform various functions described herein. In some examples, the memory 1430 may contain, among other things, a BIOS which may control basic hardware or software operation such as the interaction with peripheral components or devices.

The processor 1440 may include an intelligent hardware device (for example, a general-purpose processor, a DSP, a CPU, a microcontroller, an ASIC, an FPGA, a programmable logic device, a discrete gate or transistor logic component, a discrete hardware component, or any combination thereof). In some examples, the processor 1440 may be configured to operate a memory array using a memory controller. In other cases, a memory controller may be integrated into the processor 1440. The processor 1440 may be configured to execute computer-readable instructions stored in a memory (for example, the memory 1430) to cause the device 1405 to perform various functions (for example, functions or tasks supporting neural-network-based link-level performance prediction).

Inter-station communications manager 1455 may manage communications with other base station 105, and may include a controller or scheduler for controlling communications with UEs 115 in cooperation with other base stations 105. For example, the inter-station communications manager 1455 may coordinate scheduling for transmissions to UEs 115 for various interference mitigation techniques such as beamforming or joint transmission. In some examples, inter-station communications manager 1455 may provide an X2 interface within an LTE/LTE-A wireless communication network technology to provide communication between base stations 105.

The code 1435 may include instructions to implement aspects of the present disclosure, including instructions to support wireless communications. The code 1435 may be stored in a non-transitory computer-readable medium such as system memory or other type of memory. In some examples, the code 1435 may not be directly executable by the processor 1440 but may cause a computer (for example, when compiled and executed) to perform functions described herein.

Figure 15:
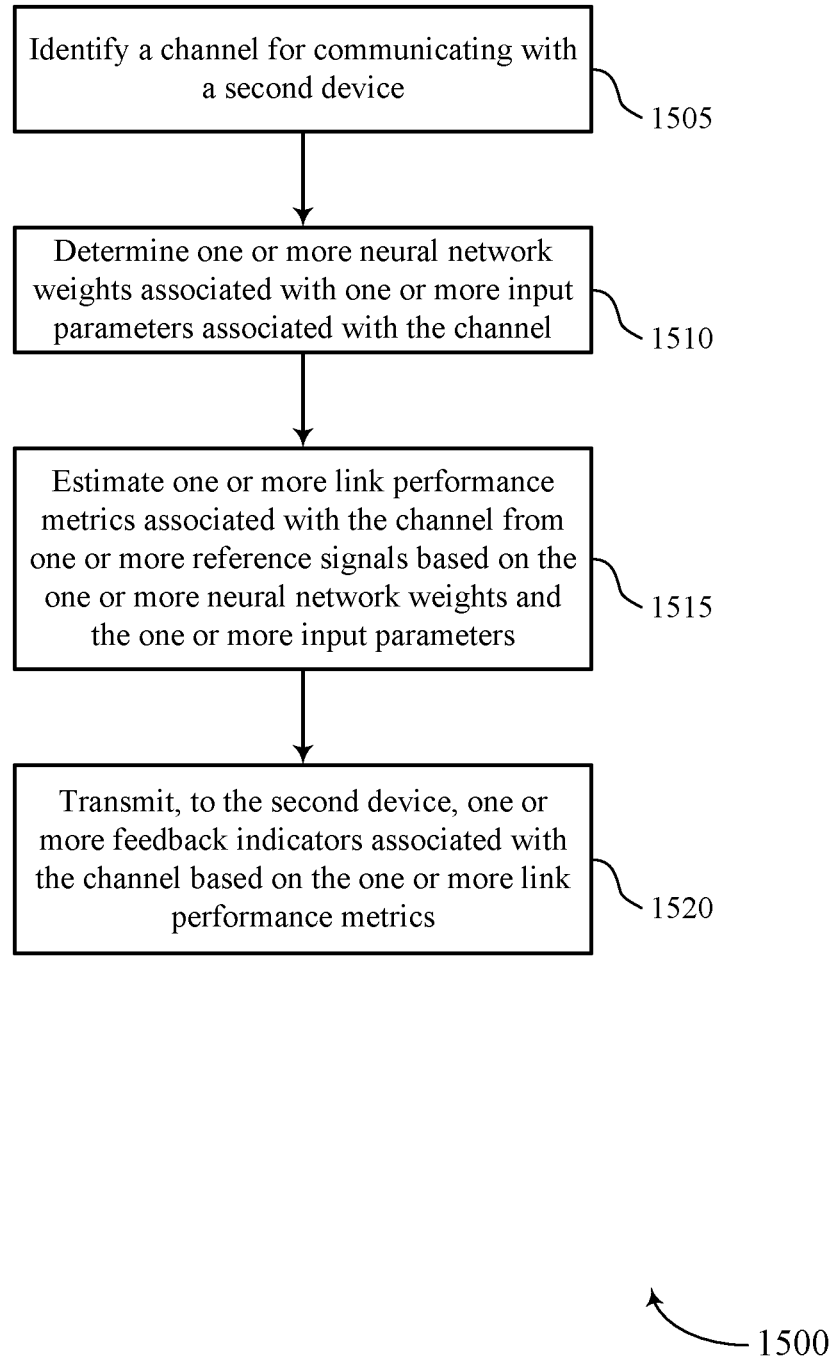
FIGS. 15-23 show flowcharts illustrating methods that support neural-network-based link-level performance prediction in accordance with aspects of the present disclosure.

FIG. 15 shows a flowchart illustrating a method 1500 that supports neural-network-based link-level performance prediction in accordance with aspects of the present disclosure. The operations of method 1500 may be implemented by a first device (for example, a UE 115 or a base station 105) or its components as described herein. For example, the operations of method 1500 may be performed by a communications manager as described with reference to FIGS. 5-9. In some examples, a device may execute a set of instructions to control the functional elements of the device to perform the functions described below. Additionally or alternatively, a device may perform aspects of the functions described below using special-purpose hardware.

At 1505, the first device may identify a channel for communicating with a second device. The operations of 1505 may be performed according to the methods described herein. In some examples, aspects of the operations of 1505 may be performed by a channel identification component as described with reference to FIGS. 5-9.

At 1510, the first device may determine one or more neural network weights associated with one or more input parameters associated with the channel. The operations of 1510 may be performed according to the methods described herein. In some examples, aspects of the operations of 1510 may be performed by a neural network manager as described with reference to FIGS. 5-9.

At 1515, the first device may estimate one or more link performance metrics associated with the channel from one or more reference signals based on the one or more neural network weights and the one or more input parameters. The operations of 1515 may be performed according to the methods described herein. In some examples, aspects of the operations of 1515 may be performed by a link performance manager as described with reference to FIGS. 5-9.

At 1520, the first device may transmit, to the second device, one or more feedback indicators associated with the channel based on the one or more link performance metrics. The operations of 1520 may be performed according to the methods described herein. In some examples, aspects of the operations of 1520 may be performed by a feedback component as described with reference to FIGS. 5-9.

Figure 16:
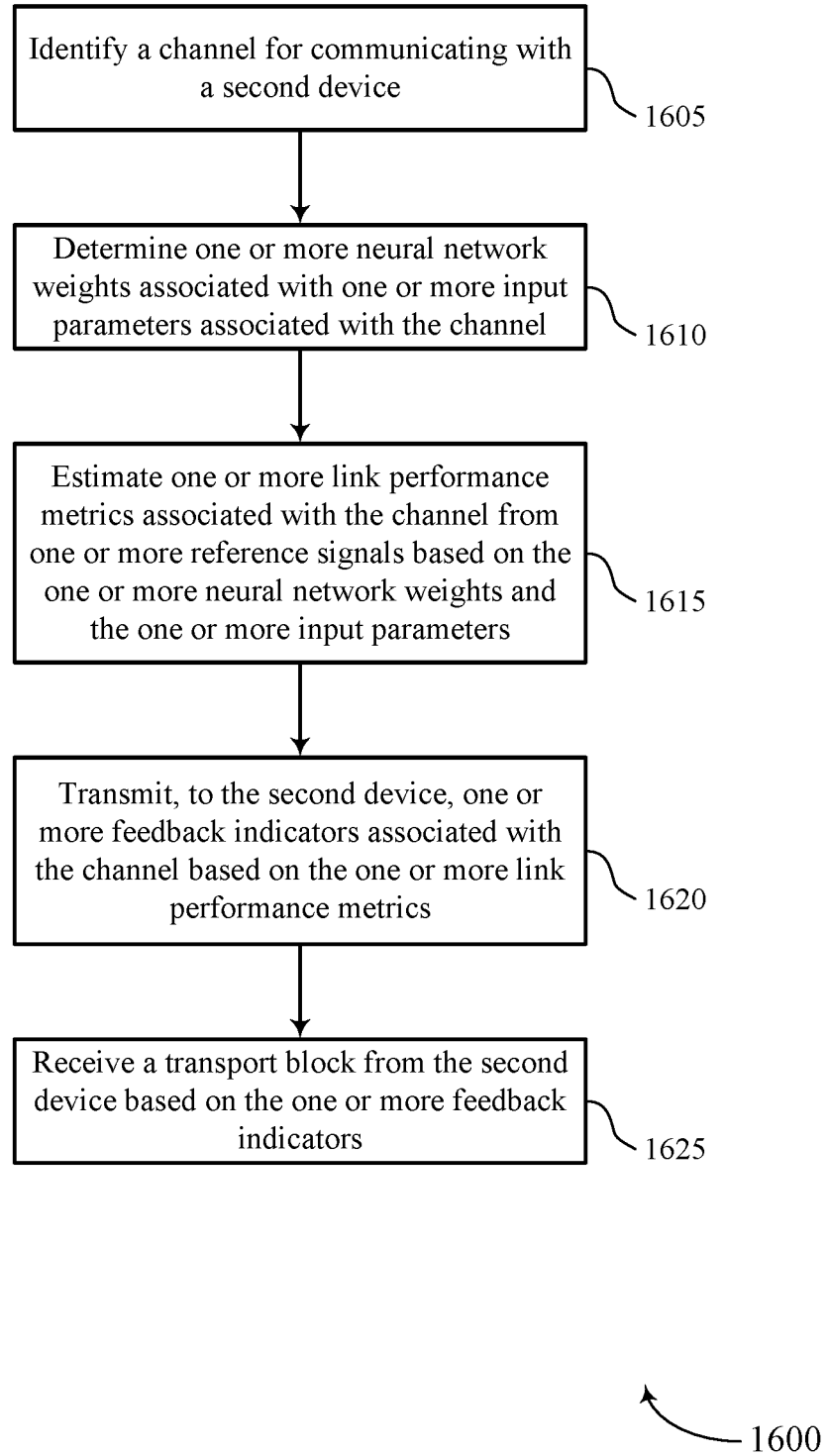

FIG. 16 shows a flowchart illustrating a method 1600 that supports neural-network-based link-level performance prediction in accordance with aspects of the present disclosure. The operations of method 1600 may be implemented by a first device (for example, a UE 115 or a base station 105) or its components as described herein. For example, the operations of method 1600 may be performed by a communications manager as described with reference to FIGS. 5-9. In some examples, a device may execute a set of instructions to control the functional elements of the device to perform the functions described below. Additionally or alternatively, a device may perform aspects of the functions described below using special-purpose hardware.

At 1605, the first device may identify a channel for communicating with a second device. The operations of 1605 may be performed according to the methods described herein. In some examples, aspects of the operations of 1605 may be performed by a channel identification component as described with reference to FIGS. 5-9.

At 1610, the first device may determine one or more neural network weights associated with one or more input parameters associated with the channel. The operations of 1610 may be performed according to the methods described herein. In some examples, aspects of the operations of 1610 may be performed by a neural network manager as described with reference to FIGS. 5-9.

At 1615, the first device may estimate one or more link performance metrics associated with the channel from one or more reference signals based on the one or more neural network weights and the one or more input parameters. The operations of 1615 may be performed according to the methods described herein. In some examples, aspects of the operations of 1615 may be performed by a link performance manager as described with reference to FIGS. 5-9.

At 1620, the first device may transmit, to the second device, one or more feedback indicators associated with the channel based on the one or more link performance metrics. The operations of 1620 may be performed according to the methods described herein. In some examples, aspects of the operations of 1620 may be performed by a feedback component as described with reference to FIGS. 5-9.

At 1625, the first device may receive a transport block from the second device based on the one or more feedback indicators. The operations of 1625 may be performed according to the methods described herein. In some examples, aspects of the operations of 1625 may be performed by a transport block manager as described with reference to FIGS. 5-9.

Figure 17:
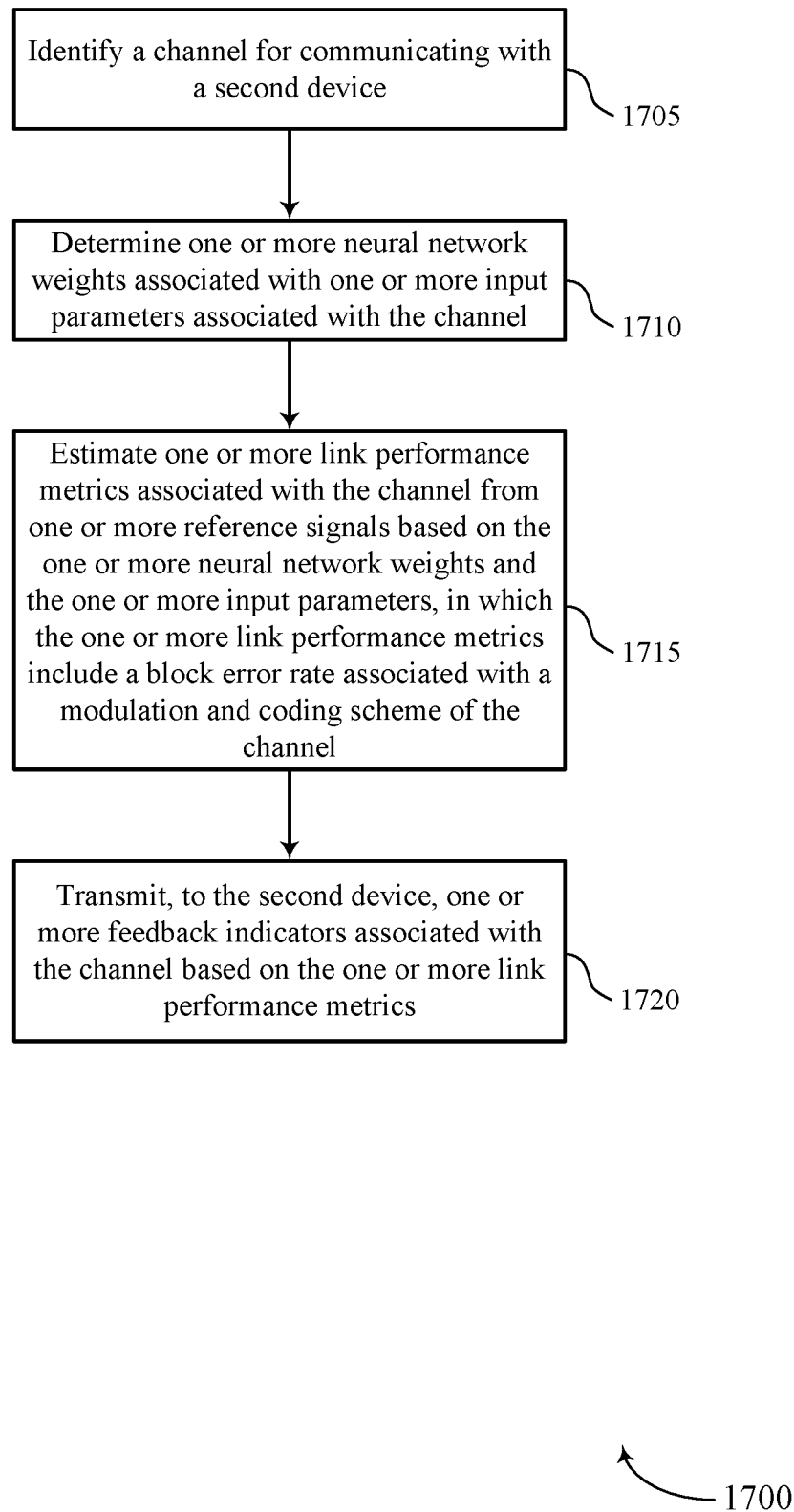

FIG. 17 shows a flowchart illustrating a method 1700 that supports neural-network-based link-level performance prediction in accordance with aspects of the present disclosure. The operations of method 1700 may be implemented by a first device (for example, a UE 115 or a base station 105) or its components as described herein. For example, the operations of method 1700 may be performed by a communications manager as described with reference to FIGS. 5-9. In some examples, a device may execute a set of instructions to control the functional elements of the device to perform the functions described below. Additionally or alternatively, a device may perform aspects of the functions described below using special-purpose hardware.

At 1705, the first device may identify a channel for communicating with a second device. The operations of 1705 may be performed according to the methods described herein. In some examples, aspects of the operations of 1705 may be performed by a channel identification component as described with reference to FIGS. 5-9.

At 1710, the first device may determine one or more neural network weights associated with one or more input parameters associated with the channel. The operations of 1710 may be performed according to the methods described herein. In some examples, aspects of the operations of 1710 may be performed by a neural network manager as described with reference to FIGS. 5-9.

At 1715, the first device may estimate one or more link performance metrics associated with the channel from one or more reference signals based on the one or more neural network weights and the one or more input parameters, in which the one or more link performance metrics include a block error rate associated with a modulation and coding scheme of the channel. The operations of 1715 may be performed according to the methods described herein. In some examples, aspects of the operations of 1715 may be performed by a link performance manager as described with reference to FIGS. 5-9.

At 1720, the first device may transmit, to the second device, one or more feedback indicators associated with the channel based on the one or more link performance metrics. The operations of 1720 may be performed according to the methods described herein. In some examples, aspects of the operations of 1720 may be performed by a feedback component as described with reference to FIGS. 5-9.

Figure 18:
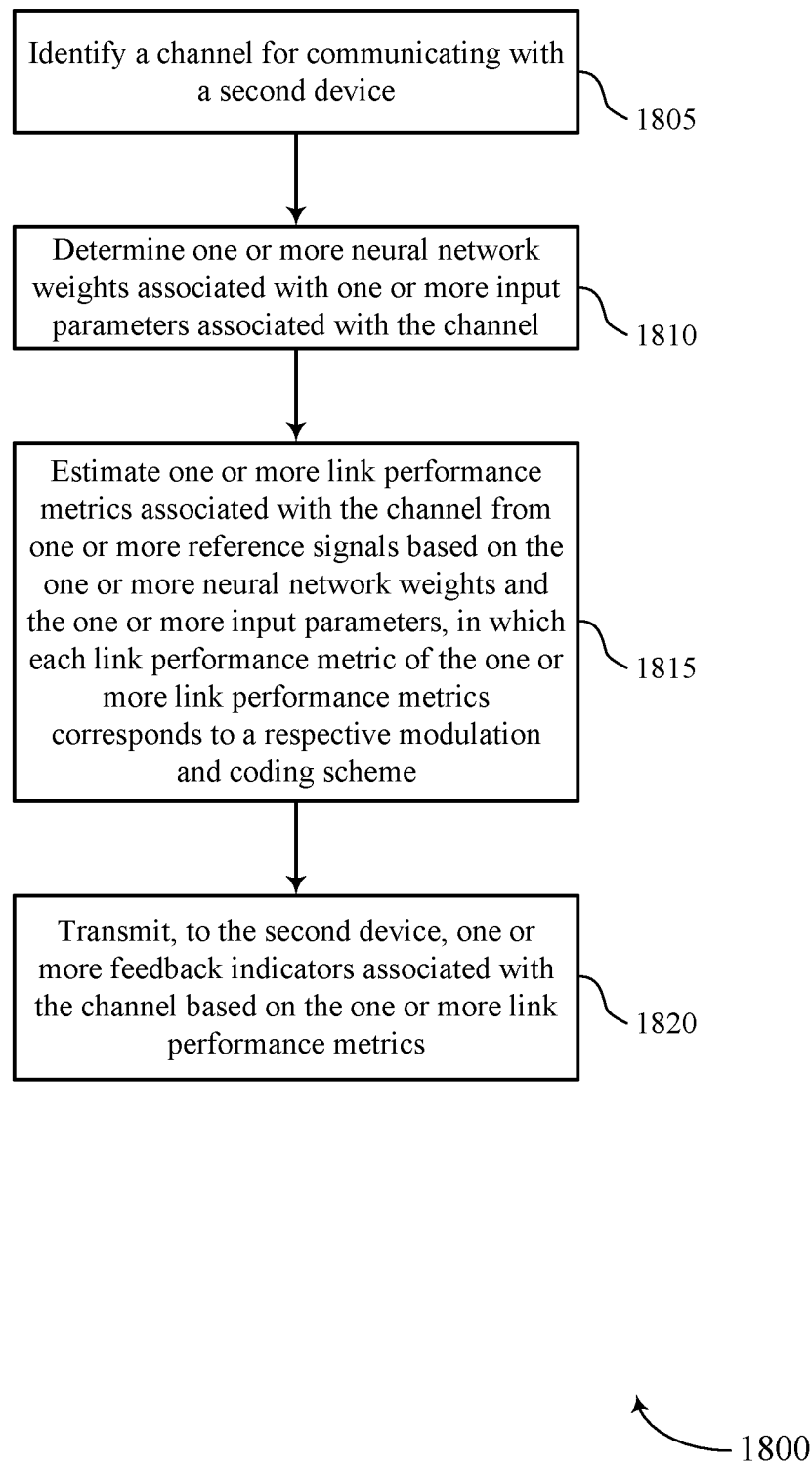

FIG. 18 shows a flowchart illustrating a method 1800 that supports neural-network-based link-level performance prediction in accordance with aspects of the present disclosure. The operations of method 1800 may be implemented by a first device (for example, a UE 115 or a base station 105) or its components as described herein. For example, the operations of method 1800 may be performed by a communications manager as described with reference to FIGS. 5-9. In some examples, a device may execute a set of instructions to control the functional elements of the device to perform the functions described below. Additionally or alternatively, a device may perform aspects of the functions described below using special-purpose hardware.

At 1805, the first device may identify a channel for communicating with a second device. The operations of 1805 may be performed according to the methods described herein. In some examples, aspects of the operations of 1805 may be performed by a channel identification component as described with reference to FIGS. 5-9.

At 1810, the first device may determine one or more neural network weights associated with one or more input parameters associated with the channel. The operations of 1810 may be performed according to the methods described herein. In some examples, aspects of the operations of 1810 may be performed by a neural network manager as described with reference to FIGS. 5-9.

At 1815, the first device may estimate one or more link performance metrics associated with the channel from one or more reference signals based on the one or more neural network weights and the one or more input parameters, in which each link performance metric of the one or more link performance metrics corresponds to a respective modulation and coding scheme. The operations of 1815 may be performed according to the methods described herein. In some examples, aspects of the operations of 1815 may be performed by a link performance manager as described with reference to FIGS. 5-9.

At 1820, the first device may transmit, to the second device, one or more feedback indicators associated with the channel based on the one or more link performance metrics. The operations of 1820 may be performed according to the methods described herein. In some examples, aspects of the operations of 1820 may be performed by a feedback component as described with reference to FIGS. 5-9.

Figure 19:
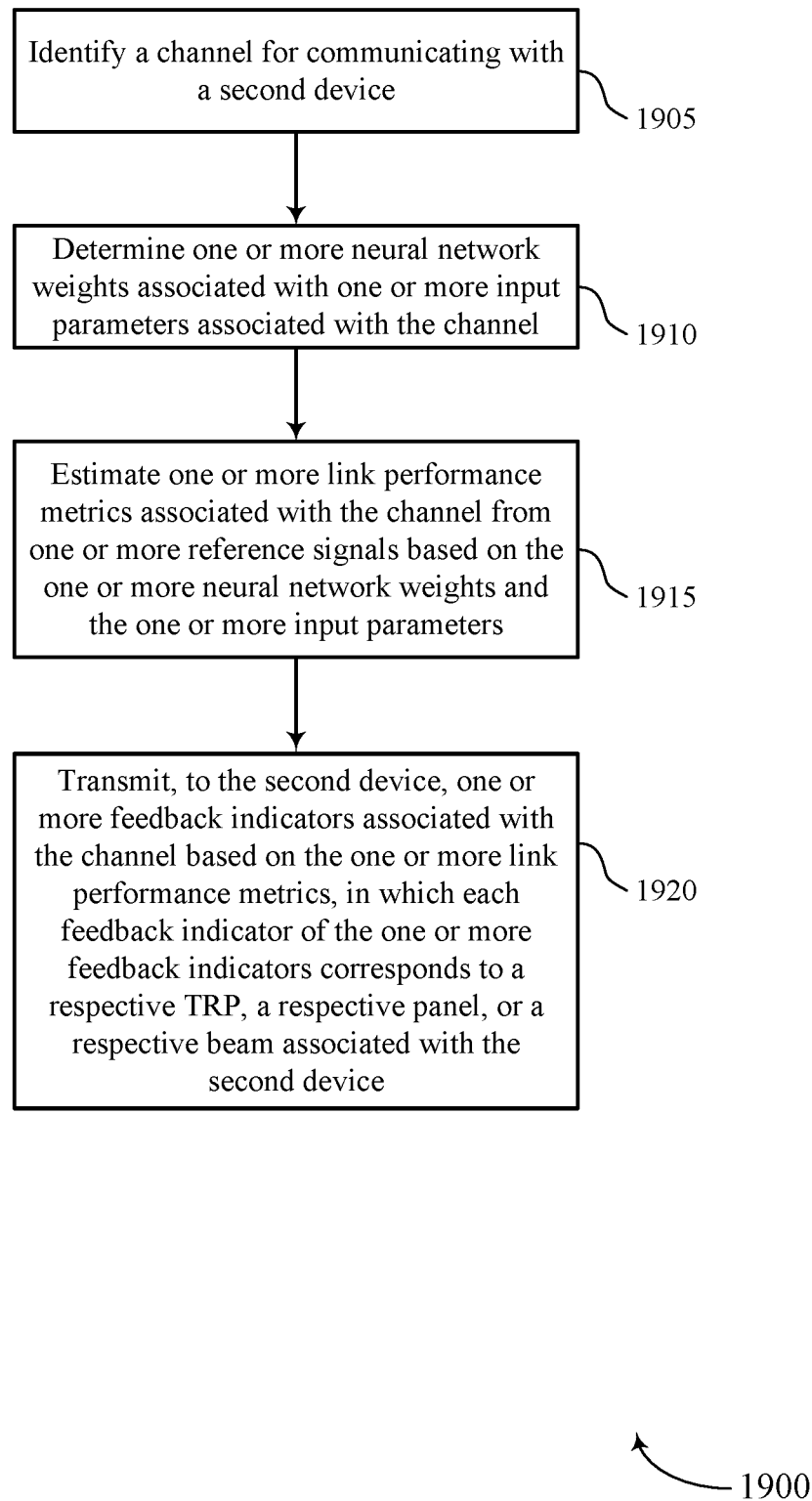

FIG. 19 shows a flowchart illustrating a method 1900 that supports neural-network-based link-level performance prediction in accordance with aspects of the present disclosure. The operations of method 1900 may be implemented by a first device (for example, a UE 115 or a base station 105) or its components as described herein. For example, the operations of method 1900 may be performed by a communications manager as described with reference to FIGS. 5-9. In some examples, a device may execute a set of instructions to control the functional elements of the device to perform the functions described below. Additionally or alternatively, a device may perform aspects of the functions described below using special-purpose hardware.

At 1905, the first device may identify a channel for communicating with a second device. The operations of 1905 may be performed according to the methods described herein. In some examples, aspects of the operations of 1905 may be performed by a channel identification component as described with reference to FIGS. 5-9.

At 1910, the first device may determine one or more neural network weights associated with one or more input parameters associated with the channel. The operations of 1910 may be performed according to the methods described herein. In some examples, aspects of the operations of 1910 may be performed by a neural network manager as described with reference to FIGS. 5-9.

At 1915, the first device may estimate one or more link performance metrics associated with the channel from one or more reference signals based on the one or more neural network weights and the one or more input parameters. The operations of 1915 may be performed according to the methods described herein. In some examples, aspects of the operations of 1915 may be performed by a link performance manager as described with reference to FIGS. 5-9.

At 1920, the first device may transmit, to the second device, one or more feedback indicators associated with the channel based on the one or more link performance metrics, in which each feedback indicator of the one or more feedback indicators corresponds to a respective TRP, a respective panel, or a respective beam associated with the second device. The operations of 1920 may be performed according to the methods described herein. In some examples, aspects of the operations of 1920 may be performed by a feedback component as described with reference to FIGS. 5-9.

Figure 20:
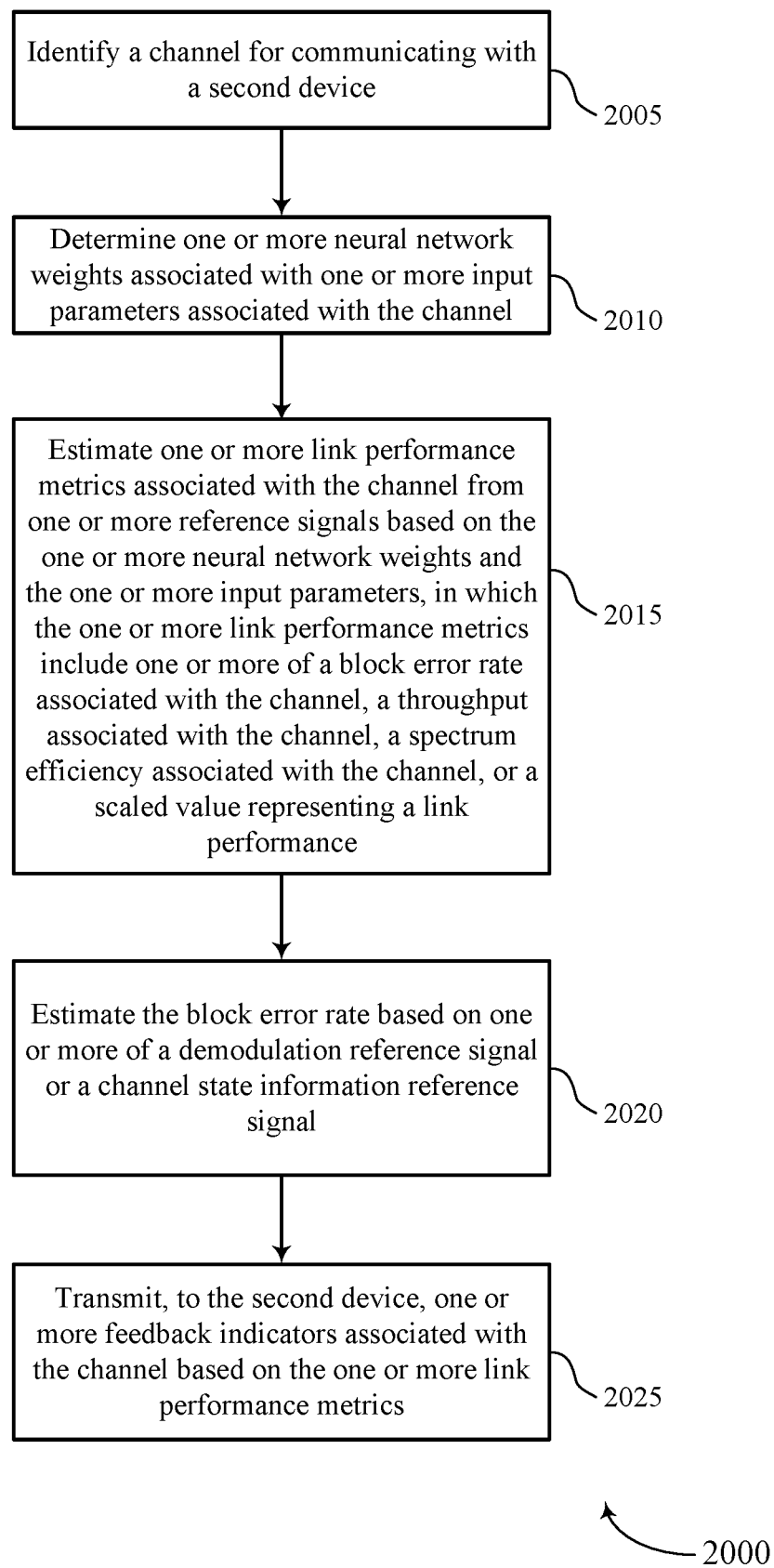

FIG. 20 shows a flowchart illustrating a method 2000 that supports neural-network-based link-level performance prediction in accordance with aspects of the present disclosure. The operations of method 2000 may be implemented by a first device (for example, a UE 115 or a base station 105) or its components as described herein. For example, the operations of method 2000 may be performed by a communications manager as described with reference to FIGS. 5-9. In some examples, a device may execute a set of instructions to control the functional elements of the device to perform the functions described below. Additionally or alternatively, a device may perform aspects of the functions described below using special-purpose hardware.

At 2005, the first device may identify a channel for communicating with a second device. The operations of 2005 may be performed according to the methods described herein. In some examples, aspects of the operations of 2005 may be performed by a channel identification component as described with reference to FIGS. 5-9.

At 2010, the first device may determine one or more neural network weights associated with one or more input parameters associated with the channel. The operations of 2010 may be performed according to the methods described herein. In some examples, aspects of the operations of 2010 may be performed by a neural network manager as described with reference to FIGS. 5-9.

At 2015, the first device may estimate one or more link performance metrics associated with the channel from one or more reference signals based on the one or more neural network weights and the one or more input parameters, in which the one or more link performance metrics include one or more of a block error rate associated with the channel, a throughput associated with the channel, a spectrum efficiency associated with the channel, or a scaled value representing a link performance. The operations of 2015 may be performed according to the methods described herein. In some examples, aspects of the operations of 2015 may be performed by a link performance manager as described with reference to FIGS. 5-9.

At 2020, the first device may estimate the block error rate based on one or more of a demodulation reference signal or a channel state information reference signal. The operations of 2025 may be performed according to the methods described herein. In some examples, aspects of the operations of 2025 may be performed by a link performance manager as described with reference to FIGS. 5-9.

At 2025, the first device may transmit, to the second device, one or more feedback indicators associated with the channel based on the one or more link performance metrics. The operations of 2030 may be performed according to the methods described herein. In some examples, aspects of the operations of 2030 may be performed by a feedback component as described with reference to FIGS. 5-9.

Figure 21:
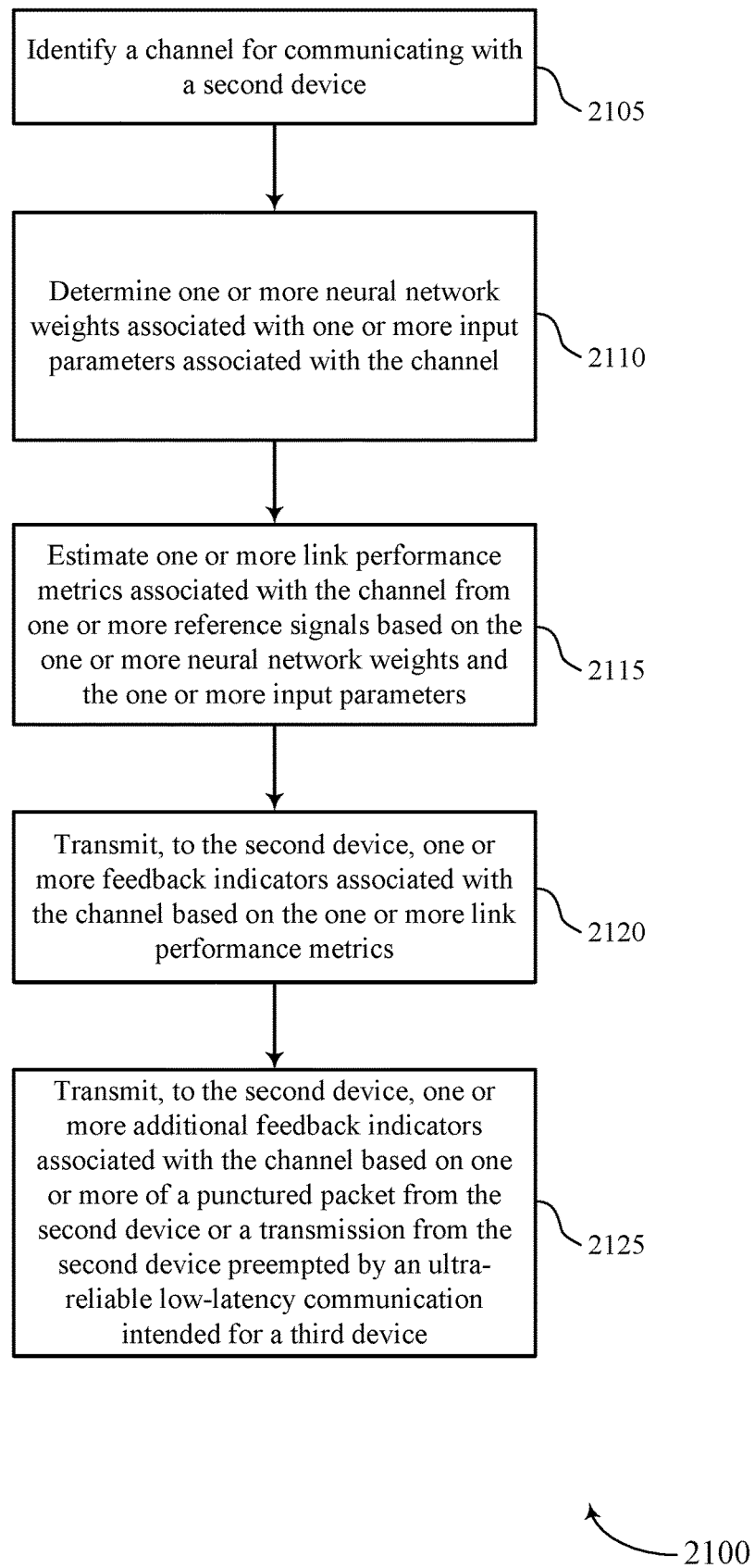

FIG. 21 shows a flowchart illustrating a method 2100 that supports neural-network-based link-level performance prediction in accordance with aspects of the present disclosure. The operations of method 2100 may be implemented by a first device (for example, a UE 115 or a base station 105) or its components as described herein. For example, the operations of method 2100 may be performed by a communications manager as described with reference to FIGS. 5-9. In some examples, a device may execute a set of instructions to control the functional elements of the device to perform the functions described below. Additionally or alternatively, a device may perform aspects of the functions described below using special-purpose hardware.

At 2105, the first device may identify a channel for communicating with a second device. The operations of 2105 may be performed according to the methods described herein. In some examples, aspects of the operations of 2105 may be performed by a channel identification component as described with reference to FIGS. 5-9.

At 2110, the first device may determine one or more neural network weights associated with one or more input parameters associated with the channel. The operations of 2115 may be performed according to the methods described herein. In some examples, aspects of the operations of 2115 may be performed by a neural network manager as described with reference to FIGS. 5-9.

At 2115, the first device may estimate one or more link performance metrics associated with the channel from one or more reference signals based on the one or more neural network weights and the one or more input parameters. The operations of 2120 may be performed according to the methods described herein. In some examples, aspects of the operations of 2120 may be performed by a link performance manager as described with reference to FIGS. 5-9.

At 2120, the first device may transmit, to the second device, one or more feedback indicators associated with the channel based on the one or more link performance metrics. The operations of 2125 may be performed according to the methods described herein. In some examples, aspects of the operations of 2125 may be performed by a feedback component as described with reference to FIGS. 5-9.

2125, the first device may transmit, to the second device, one or more additional feedback indicators associated with the channel based on one or more of a punctured packet from the second device or a transmission from the second device preempted by an ultra-reliable low-latency communication intended for a third device. The operations of 2125 may be performed according to the methods described herein. In some examples, aspects of the operations of 2125 may be performed by a feedback component as described with reference to FIGS. 5-9.

Figure 22:
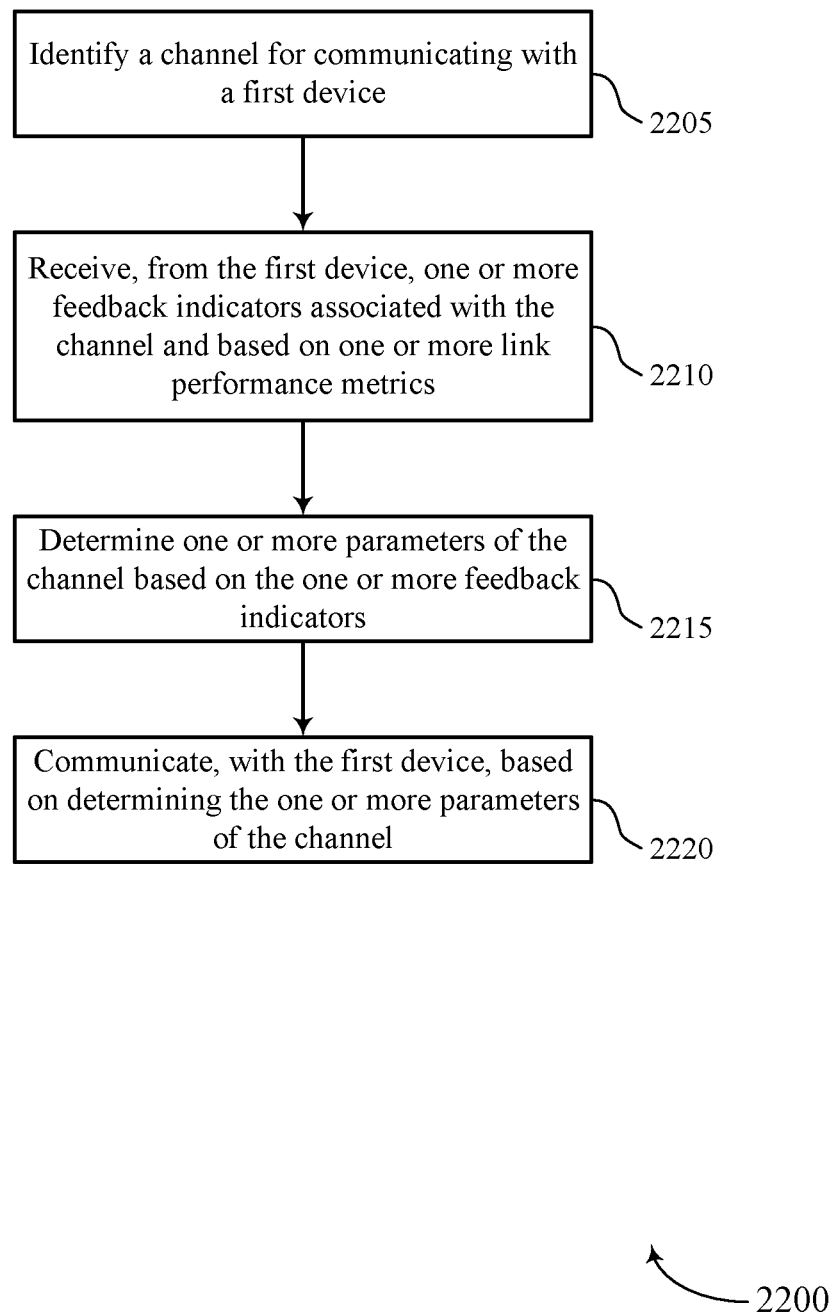

FIG. 22 shows a flowchart illustrating a method 2200 that supports neural-network-based link-level performance prediction in accordance with aspects of the present disclosure. The operations of method 2200 may be implemented by a second device (for example, a UE 115 or a base station 105) or its components as described herein. For example, the operations of method 2200 may be performed by a communications manager as described with reference to FIGS. 10-14. In some examples, a device may execute a set of instructions to control the functional elements of the device to perform the functions described below. Additionally or alternatively, a device may perform aspects of the functions described below using special-purpose hardware.

At 2205, the second device may identify a channel for communicating with a first device. The operations of 2205 may be performed according to the methods described herein. In some examples, aspects of the operations of 2205 may be performed by a communication channel component as described with reference to FIGS. 10-14.

At 2210, the second device may receive, from the first device, one or more feedback indicators associated with the channel and based on one or more link performance metrics. The operations of 2210 may be performed according to the methods described herein. In some examples, aspects of the operations of 2210 may be performed by a channel feedback manager as described with reference to FIGS. 10-14.

At 2215, the second device may determine one or more parameters of the channel based on the one or more feedback indicators. The operations of 2215 may be performed according to the methods described herein. In some examples, aspects of the operations of 2215 may be performed by a channel parameter manager as described with reference to FIGS. 10-14.

At 2220, the second device may communicate, with the first device, based on determining the one or more parameters of the channel. The operations of 2220 may be performed according to the methods described herein. In some examples, aspects of the operations of 2220 may be performed by a communication channel component as described with reference to FIGS. 10-14.

Figure 23:
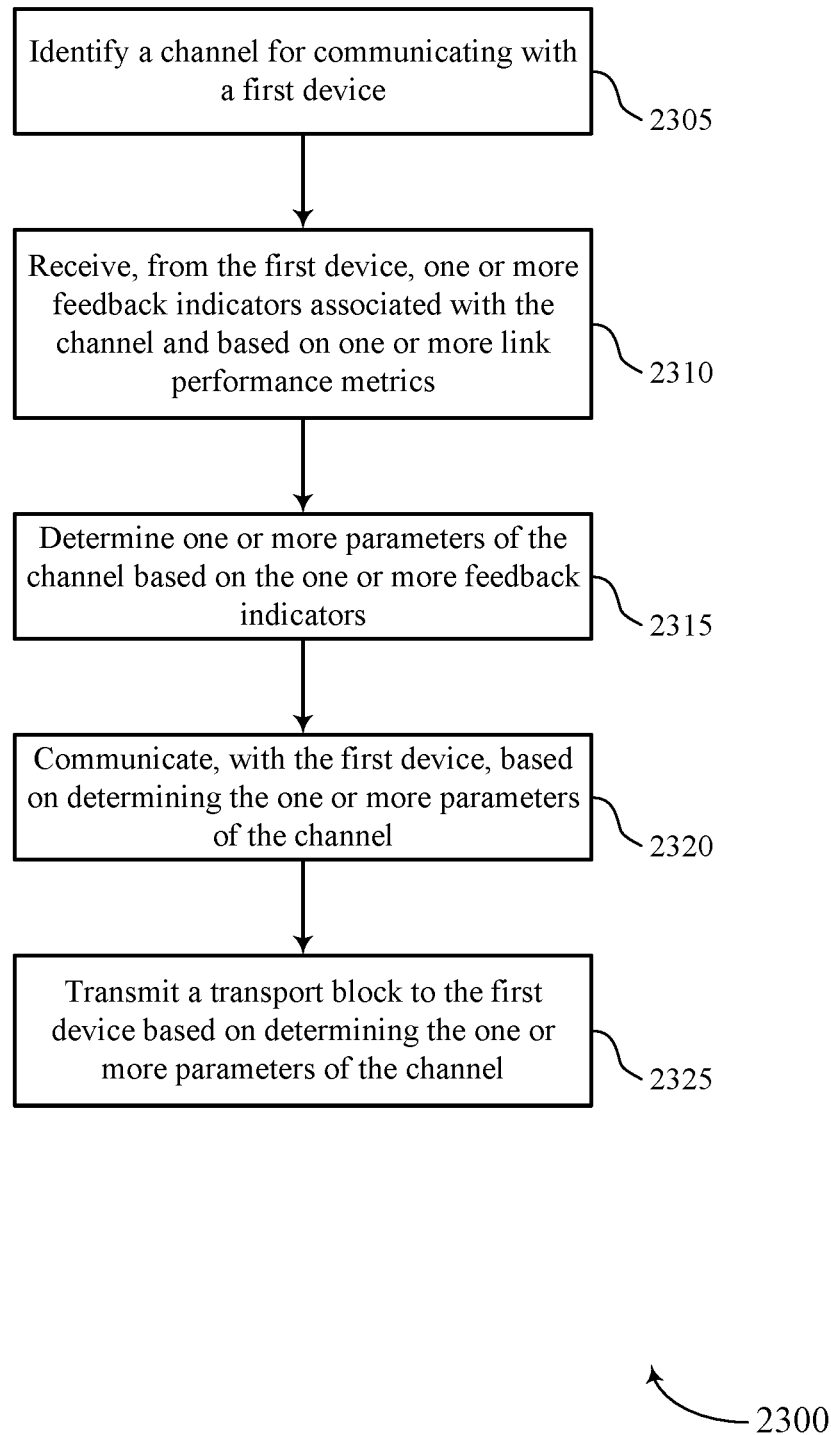

FIG. 23 shows a flowchart illustrating a method 2300 that supports neural-network-based link-level performance prediction in accordance with aspects of the present disclosure. The operations of method 2300 may be implemented by a second device (for example, a UE 115 or a base station 105) or its components as described herein. For example, the operations of method 2300 may be performed by a communications manager as described with reference to FIGS. 10-14. In some examples, a device may execute a set of instructions to control the functional elements of the device to perform the functions described below. Additionally or alternatively, a device may perform aspects of the functions described below using special-purpose hardware.

At 2305, the second device may identify a channel for communicating with a first device. The operations of 2305 may be performed according to the methods described herein. In some examples, aspects of the operations of 2305 may be performed by a communication channel component as described with reference to FIGS. 10-14.

At 2310, the second device may receive, from the first device, one or more feedback indicators associated with the channel and based on one or more link performance metrics. The operations of 2310 may be performed according to the methods described herein. In some examples, aspects of the operations of 2310 may be performed by a channel feedback manager as described with reference to FIGS. 10-14.

At 2315, the second device may determine one or more parameters of the channel based on the one or more feedback indicators. The operations of 2315 may be performed according to the methods described herein. In some examples, aspects of the operations of 2315 may be performed by a channel parameter manager as described with reference to FIGS. 10-14.

At 2320, the second device may communicate, with the first device, based on determining the one or more parameters of the channel. The operations of 2320 may be performed according to the methods described herein. In some examples, aspects of the operations of 2320 may be performed by a communication channel component as described with reference to FIGS. 10-14.

At 2325, the second device may transmit a transport block to the first device based on determining the one or more parameters of the channel. The operations of 2325 may be performed according to the methods described herein. In some examples, aspects of the operations of 2325 may be performed by a transport block transmission manager as described with reference to FIGS. 10-14.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (for example, a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at different locations, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (that is, A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other later reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications, comprising:
identifying, at a first device, a channel for communicating with a second device;
determining one or more neural network weights associated with one or more input parameters associated with the channel based at least in part on the first device measuring one or more reference signals received on the channel;
estimating one or more link performance metrics associated with the channel based at least in part on the one or more neural network weights and the one or more input parameters; and
transmitting, to the second device, one or more feedback indicators associated with the channel based at least in part on the one or more link performance metrics.

2. The method of claim 1, further comprising receiving a transport block from the second device based at least in part on the one or more feedback indicators.

3. The method of claim 2, further comprising initiating decoding of the transport block based at least in part on the one or more link performance metrics.

4. The method of claim 2, further comprising determining not to decode the transport block based at least in part on the one or more link performance metrics, wherein the one or more feedback indicators comprise a negative acknowledgment.

5. The method of claim 2, further comprising:
decoding one or more initial code blocks of the transport block; and
determining not to decode one or more later code blocks of the transport block based at least in part on the one or more link performance metrics.

6. The method of claim 2, further comprising:
determining a plurality of repetitions of the transport block in one or more of a frequency domain, a time domain, or a spatial domain; and
decoding one or more of the plurality of repetitions of the transport block based at least in part on the one or more link performance metrics.

7. The method of claim 1, wherein the one or more link performance metrics comprise one or more of a block error rate associated with the channel, a throughput associated with the channel, a spectrum efficiency associated with the channel, or a scaled value representing a link performance.

8. The method of claim 7, wherein the block error rate is associated with a modulation and coding scheme of the channel.

9. The method of claim 1, wherein estimating the one or more link performance metrics comprises:
estimating the one or more link performance metrics based at least in part on one or more of a demodulation reference signal or a channel state information reference signal.

10. The method of claim 1, wherein each link performance metric of the one or more link performance metrics corresponds to a respective modulation and coding scheme.

11. The method of claim 1, wherein the one or more input parameters associated with the channel comprise one or more of a modulation and coding scheme, a rank, a precoding matrix indicator, an estimated Doppler measurement, an interference variance estimation, a noise variance estimation, a decoder feature, or a hybrid automatic repeat request.

12. The method of claim 1, wherein the one or more feedback indicators comprise one or more of one or more acknowledgments, one or more negative acknowledgments, one or more precoding matrix indicators, one or more rank indicators, one or more channel quality indicators, one or more channel state information reports, one or more downlink feedback information, or one or more new data indicators.

13. The method of claim 1, wherein each feedback indicator of the one or more feedback indicators corresponds to a respective transmission-reception point, a respective panel, or a respective beam associated with the second device.

14. The method of claim 1, further comprising transmitting one or more additional feedback indicators associated with the channel based at least in part on one or more of a punctured packet from the second device or a transmission from the second device preempted by an ultra-reliable low-latency communication intended for a third device.

15. A method for wireless communications, comprising:
identifying, at a second device, a channel for communicating with a first device;
transmitting, to the first device, one or more reference signals on the channel;
receiving, from the first device, one or more feedback indicators associated with the channel and based at least in part on one or more link performance metrics and transmitting the one or more reference signals;
determining one or more parameters of the channel based at least in part on the one or more feedback indicators; and
communicating, with the first device, based at least in part on determining the one or more parameters of the channel.

16. The method of claim 15, further comprising transmitting a transport block to the first device based at least in part on determining the one or more parameters of the channel.

17. The method of claim 16, wherein transmitting the transport block to the first device comprises transmitting a plurality of repetitions of the transport block in one or more of a frequency domain, a time domain, or a spatial domain.

18. The method of claim 17, wherein determining a quantity of repetitions of the transport block based at least in part on determining the one or more parameters of the channel, and wherein transmitting the plurality of repetitions of the transport block is based at least in part on determining the quantity of repetitions.

19. The method of claim 15, wherein the one or more link performance metrics comprise one or more of a block error rate associated with the channel, a throughput associated with the channel, a spectrum efficiency associated with the channel, or a scaled value representing a link performance.

20. The method of claim 19, wherein the block error rate is associated with a modulation and coding scheme of the channel.

21. The method of claim 15, wherein the one or more link performance metrics are based at least in part on one or more of a demodulation reference signal, a channel state information reference signal, or a packet received from the second device.

22. The method of claim 15, wherein the one or more parameters of the channel comprise one or more of a modulation and coding scheme, a rank, a precoding matrix indicator, an estimated Doppler measurement, an interference variance estimation, a noise variance estimation, a decoder feature, or a hybrid automatic repeat request.

23. The method of claim 15, wherein the one or more feedback indicators comprise one or more of one or more acknowledgments, one or more negative acknowledgments, one or more precoding matrix indicators, one or more rank indicators, one or more channel quality indicators, one or more channel state information reports, one or more downlink feedback information, one or more new data indicators, or one or more additional feedback indicators based at least in part on one or more of a punctured packet from the second device or a transmission from the second device preempted by an ultra-reliable low-latency communication intended for a third device.

24. The method of claim 15, wherein each feedback indicator of the one or more feedback indicators corresponds to a respective transmission-reception point of one or more transmission-reception points, a respective panel of one or more panels, or a respective beam associated with the second device of one or more beams.

25. The method of claim 24, further comprising determining a transmission-reception point of the one or more transmission-reception points, a panel of the one or more panels, or a beam of the one or more beams for later scheduling based at least in part on determining the one or more parameters of the channel, wherein communicating with the first device is based at least in part on determining the transmission-reception point, the panel, or the beam for later scheduling.

26. An apparatus for wireless communications, comprising: a processor, memory coupled with the processor; and instructions stored in the memory and executable by the processor to cause the apparatus to:
identify, at a first device, a channel for communicating with a second device;
determine one or more neural network weights associated with one or more input parameters associated with the channel based at least in part on the first device measuring one or more reference signals received on the channel;
estimate one or more link performance metrics associated with the channel based at least in part on the one or more neural network weights and the one or more input parameters; and
transmit, to the second device, one or more feedback indicators associated with the channel based at least in part on the one or more link performance metrics.

27. The apparatus of claim 26, wherein the instructions are further executable by the processor to cause the apparatus to receive a transport block from the second device based at least in part on the one or more feedback indicators.

28. The apparatus of claim 26, wherein the one or more link performance metrics comprise one or more of a block error rate associated with the channel, a throughput associated with the channel, a spectrum efficiency associated with the channel, or a scaled value representing a link performance.

29. An apparatus for wireless communications, comprising: a processor, memory coupled with the processor; and instructions stored in the memory and executable by the processor to cause the apparatus to:
identify, at a second device, a channel for communicating with a first device;
transmitting, to the first device, one or more reference signals on the channel;
receive, from the first device, one or more feedback indicators associated with the channel and based at least in part on one or more link performance metrics and transmitting the one or more reference signals;
determine one or more parameters of the channel based at least in part on the one or more feedback indicators; and
communicate, with the first device, based at least in part on determining the one or more parameters of the channel.

30. The apparatus of claim 29, wherein the instructions are further executable by the processor to cause the apparatus to transmit a transport block to the first device based at least in part on determining the one or more parameters of the channel.

* * * * *